US011947707B2

(12) United States Patent
Thatcher et al.

(10) Patent No.: US 11,947,707 B2
(45) Date of Patent: Apr. 2, 2024

(54) ON-DEVICE DECISION MAKING

(71) Applicant: Vungle, Inc., San Francisco, CA (US)

(72) Inventors: Gregory Garland Thatcher, San Francisco, CA (US); Hammond Guerin, San Francisco, CA (US); Jian Chen, Oakland, CA (US); Akifumi Shinagawa, Millbrae, CA (US); Albert Tsai, San Francisco, CA (US)

(73) Assignee: Vungle, Inc., San Francisco, CA (US)

( * ) Notice: Subject to any disclaimer, the term of this patent is extended or adjusted under 35 U.S.C. 154(b) by 333 days.

(21) Appl. No.: 17/240,739

(22) Filed: Apr. 26, 2021

(65) Prior Publication Data

US 2022/0343024 A1 Oct. 27, 2022

(51) Int. Cl.
*G06F 21/62* (2013.01)
*G06Q 30/0241* (2023.01)
*H04L 9/40* (2022.01)

(52) U.S. Cl.
CPC ..... *G06F 21/6263* (2013.01); *G06Q 30/0241* (2013.01); *H04L 63/101* (2013.01); *H04L 63/108* (2013.01)

(58) Field of Classification Search
CPC .................................................. G06F 21/6263
See application file for complete search history.

(56) References Cited

U.S. PATENT DOCUMENTS

| 2010/0299205 | A1* | 11/2010 | Erdmann | G06Q 30/02 |
| | | | | 705/14.54 |
| 2012/0185334 | A1* | 7/2012 | Sarkar | G06Q 30/0261 |
| | | | | 705/14.66 |
| 2016/0292722 | A1* | 10/2016 | Myers | G06Q 30/0243 |
| 2021/0042724 | A1* | 2/2021 | Rathod | G07G 1/0054 |
| 2022/0398345 | A1* | 12/2022 | Kravitz | G06F 3/0482 |
| 2023/0015289 | A1* | 1/2023 | Gilboy | H04L 63/04 |

* cited by examiner

*Primary Examiner* — Ponnoreay Pich
(74) *Attorney, Agent, or Firm* — Athorus, PLLC

(57) ABSTRACT

Systems and methods for obtaining an external content item from an online service for presentation on the client device is presented. On the client device, a condition is detected in the execution context of an executing application, the condition corresponding to the presentation of an external content item by the application. A request is made to the online service for content items. In response, content information is received, where the content information identifies potential content items. According to various embodiments, initial scores are associated with each potential content item in the content information. At the client device, a completed score is generated for each content item according to local information on the client device and the corresponding initial score. An external content item is selected for presentation on the client device from the potential content items according to, at least in part, the completed scores.

20 Claims, 13 Drawing Sheets

ON-DEVICE DECISION MAKING

BACKGROUND

Due to personal privacy concerns, it is likely that online services will face more and more restrictions on what personal information they can store, for what purposes the personal information can be used, where that personal information can be stored, protections that must be in place regarding the storage of personal information, when stored personal information must be deleted, who owns the personal information, etc. These issues and questions pose significant challenges to the manner in which online services currently operate.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
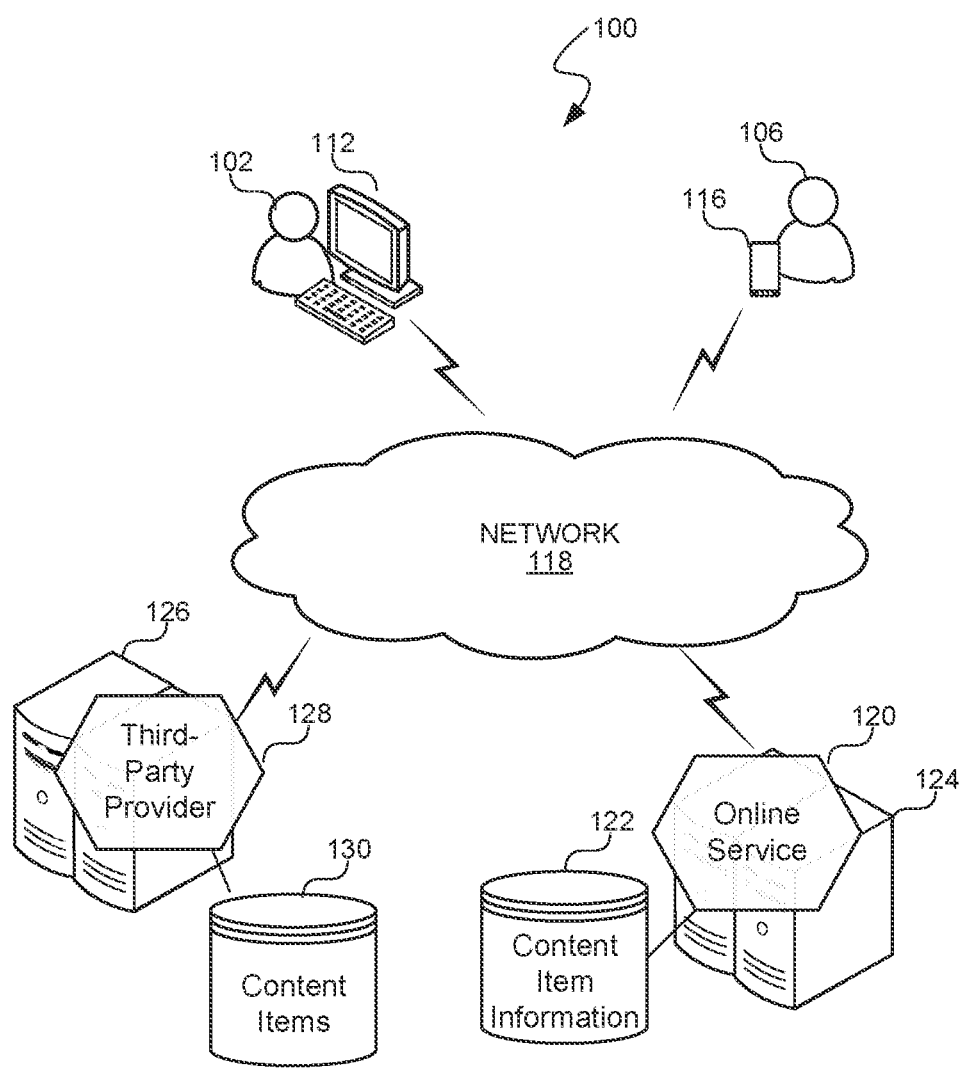
FIG. 1 is a block diagram illustrating an exemplary network environment suitable for implementing aspects of the disclosed subject matter.

Systems and methods are presented in which a client device can be presented with one or more relevant, external content items for presentation on the client device from an online service without the online service violating privacy concerns and regulations touching on maintaining personal identifying information (PII) of a user.

According to aspects of the disclosed subject matter, and in an effort to provide user-relevant content of content items that are maintained by an online service, while also ensuring user privacy and compliance with user privacy mandates, various embodiments of the disclosed subject matter are provided. Indeed, in a first embodiment, personal identifying information (PII) of a user is maintained locally to that user, i.e., on the user's client device. At the client device, and upon detecting a condition to present external content to the user on the client device, a request is made from the client device to the online service to provide external content for presentation to a user. In order for the online service to determine which content item, from a data store of content items, to present to the user on the client device, the online service identifies those content items which could be presented to the user on the client device, i.e., potential content items. After identifying the potential content items, the online service returns information identifying the potential content items along with queries for the client device to answer. The queries correspond to the potential content items and the answers to the queries, which may contain PII of the user, are returned to the online service. Based on the answers to the queries for the potential content items, the online service selects a content item, from the potential content items identified to the client device, for presentation to the user on the client device. After selecting the content item for presentation to the user on the client device, the online service discards the answers received from the client device such that no PII of the user is maintained by the online service.

In a second embodiment of the disclosed subject matter, the client device, upon detecting a condition to present external content to the user, makes or issues a request to the online service for an external content item. The online service identifies potential content items that could be presented to the user of the client device in response to the request. For each potential content item, the online service generates one or more initial scores. Information regarding the potential content items and their corresponding initial scores is sent to the client device. For its part, the client device processes the initial score or scores of each potential content item in view of locally maintained information of the user and the client device—much of which may be viewed as personal identifying information (PII). The result of processing the initial scores is to generate completed scores for the potential content items. Information regarding the potential content items, including the corresponding completed scores, is returned to the online service. Advantageously, the completed scores correspond to values that do not include or identify PII. Indeed, according to aspects of the disclosed subject matter, the completed scores cannot be later processed to determine the PII used to generate the completed scores. In some embodiments, the online service can further process the completed scores of the potential content items to generate overall value scores for the potential content items. This processing by the online service makes use of information available to the online service, often reflecting campaign or promotion information that may cause a reordering of the potential content items. Based on the completed scores or, in alternative embodiments, the overall value scores, the online service selects a content item for presentation to the user on the client device and provides information regarding the selected content item to the client device.

In yet another embodiment of the disclosed subject matter, and upon detecting a condition to present external content to the user on the client device, the client device requests an external content item from the online service. The online service identifies potential content items that may be presented to the user of the client device. For each potential content item, the online service may generate one or more initial scores. Additionally, the online service may provide processing instructions, including one or more operations to carry out, for determining an overall value score for each of the potential content items. The client device processes the initial scores according to, at least, the processing functions or operations identified by the online service. This processing, done on the client device, is made in view of the locally maintained information regarding the user and the client device. Based on the processing of the initial scores and the operations provided by the online service, the client device determines scores for the potential content items and selects a content item from the potential content items as the external content item to be presented on the client device in view of the scores. Advantageously, little to no personal identifying information (PII) is provided to the online service.

In at least one embodiment of the disclosed subject matter, systems and methods are presented in which a client device can be presented with external content items from an online service for presentation in an execution context of the client device, and without the online service violating privacy concerns and regulations touching on maintaining personal identifying information (PII) of a user. In one embodiment, a client device maintains personal identifying information of a user in a data store local to the client device. When an execution context or execution condition is detected for displaying an external content item that is not part of an executing application, a request is made to an online service which maintains content items. In response to the request, the online service identifies and returns content item information regarding a plurality of content items (external content items) to the execution context of the client device that are available for presentation to the user on the client device at the time of the request. In various embodiments, the content item information includes information that corresponds to a plurality of external content items and an initial score for each of the plurality of external content items. The client device processes the content item information and generates one or more completed scores for each external content item represented therein. These completed scores are generated according to information maintained in the local data store on the client device and according to the initial scores. The one or more completed scores are returned to the online service where they may be further processed into value scores. This further processing by the online service may be made by one or more trained, machine learning models that can generate predicted value scores for the external content items that were identified in the content item information. An external content item of the external content items that were identified by the content item information is selected according to the value scores, and a message to the client device may identify the selected, external content item for presentation in the execution context of the application on the client device.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)," the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with multiple items should be viewed as meaning either or both items.

To better illustrate aspects of the disclosed subject matter, reference is now made to the figures. FIG. 1 is a block diagram illustrating an exemplary network environment 100 suitable for implementing aspects of the disclosed subject matter. The exemplary network environment 100 includes one or more client devices 112 and 116 that are utilized by users 102 and 106, respectively.

Regarding client devices and by way of illustration and not limitation, it should be appreciated that suitable client devices include any number of computing devices. Indeed, these may include, by way of illustration and not limitation, mobile phone devices (such as client device/mobile phone 116), tablet computers, laptop computers, the so-called phablet computing devices (the hybrid phone/tablet computing devices), desktop computers, gaming devices and consoles, IoT (internet of things) devices, and the like. Further, user terminals connected to multi-user computers such as mini- and mainframe-computers may also be viewed as client devices.

The exemplary network environment 100 also includes a computer network 118. As those skilled in the art will appreciate, a computer network is a communication network that interconnects a collection of computers, servers and client devices (such as client devices 112 and 116), other networks and/or network-enabled devices e.g., printers, storage devices, routers, firewalls, etc. A computer network, such as computer network 118, typically utilizes a set of common communication protocols for the purpose of sharing and communicating resources and data. Each device, whether it is a "computer," such as client devices 112 and 116, a network-enabled device, an online service such as online service 120, a hosting device such as computer servers 124 and 126, or the like, and even other networks and/or subnetworks, may be viewed as nodes of a computer network. The interconnections between nodes on the computer network are formed from a broad spectrum of telecommunication network technologies. Nodes typically connect to a network, such as computer network 118, though network interface controllers or NICs over one or more of communication mediums such as wired, optical, and/or wireless (i.e., radio-frequency) mediums. Those skilled in the art will also appreciate that computer networks may be arranged in a variety of network topologies and combinations of network topologies. Some of these topologies may comprise one or more of a star network, a ring network, a mesh network, a tree network, a local area network, a wide area network, and the like. A commonly used and well-known network is the Internet. As should be readily appreciated, the Internet is a global system of interconnected computer networks and devices that uses the Internet protocol suite Transmission Control Protocol/Internet Protocol or, more simply, TCP/IP, to communicate between network nodes.

As mentioned, the exemplary network environment 100 is shown as including an online service 120, hosted and executing on a computer server 124. In accordance with aspects of the disclosed subject matter, the online service 120 is configured to respond to a request from a client device, such as client device 116, with information regarding a set of external content items from which at least one may be selected and presented by an executing application on the requesting client device. The online service 120 may identify the set of external content items from information in a content item information data store 122 maintained by the online service. According to aspects of the disclosed subject matter, the content items identified by the online service 120 from the content item information data store are "external content items" to the executing application of the client device in which an external content item is to be presented. In various embodiments, the content item information that is stored and maintained in the content item information data store 122 is often provided to the online service 120 from third-party providers. For example, the content item information data store 122 may reference one or more content items 130 of third-party provider 128 operating on computer server 126. Indeed, according to aspects of the disclosed subject matter, the content item information data store 122 includes sufficient information for the online service 120 to select a content item for display in a client device as well as information for obtaining a selected content item, including its constituent elements, from one or more locations on the computer network 118.

According to aspects of the disclosed subject matter, content items may correspond to images, audio data, and/or audio/visual content, as well as other instances and combinations of content/data. Content items may comprise multiple constituent elements: i.e., video content, one or more executable modules, text content, one or more images, one or more uniform resource locators (URLs), and the like. Further, in various embodiments these external content items may correspond to advertisements from the third-party providers, and particularly correspond to in-application advertisements from the third parties. While many external content items represented in the content item information data store 122 reference content items available from third-parties, according to aspects of the disclosed subject matter, an external content item, i.e., external to the provider of the executing application on the client device, may be from the same provider or source of the executing application, though the external content item is not an element, at least at the time of a request, of the executing application. For example, the external content item may correspond to an advertisement for a feature or service not currently included in the executing application, but available from the same provider as the executing application.

As described in this document, there are multiple embodiments in which an online service identifies and provides an external content item to a client device for display in the context of an executing application on the client device, each of which provides an advantage of maintaining and/or retaining PII on the client device. Indeed, FIGS. 2, 4 and 6 each correspond to a particular embodiment of the disclosed subject matter, and each illustrate an exemplary interaction between an online service and a client device in providing an external content item for display on the client device within the execution context of an application. FIGS. 3A-3B, 5A-5B, and 7A-7B illustrate exemplary routines, as carried out by a client device or an online service, in identifying and presenting an external content item on the client device.

Figure 2:
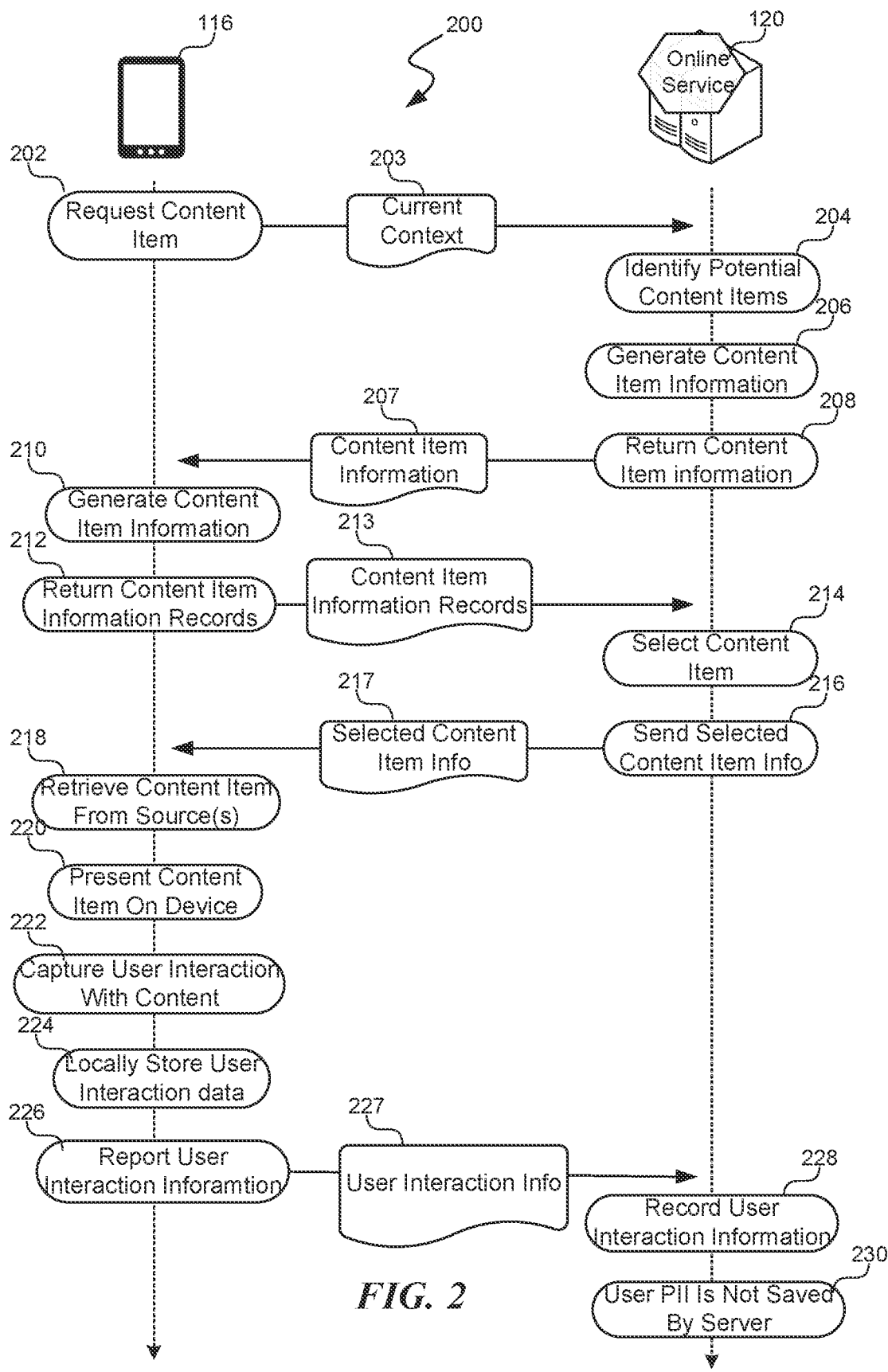
FIG. 2 is a block diagram illustrating an exemplary interaction between a client device and an online service to identify and provide an external item for presentation on the client device within the context of an executing application, in accordance with aspects of the disclosed subject matter.

Turning, now, to FIG. 2, this figure is a block diagram illustrating an exemplary interaction 200 between a client device 116 and an online service 120 to identify an external content item for presentation on the client device within an execution context of an application, in accordance with aspects of the disclosed subject matter. This interaction begins by the detection of an execution condition of the executing application on the client device 116, the condition corresponding to a point in execution on the client device for presenting an external content item.

In response to detecting the execution condition, at step 202 a request for an external content item is made to the online service 120. As shown in the exemplary interaction and according to aspects of the disclosed subject matter, the request may include or be accompanied with current context information 203. This current context information may include, by way of illustration and not limitation, the identity of the application and the execution context of the application on the client device from which the request was made, communication information regarding the capabilities and/or available bandwidth of the client device, display information such as display size, resolution, display features, etc., of the client device, and the like. Indeed, the current context information 203 includes information reasonably calculated to provide the online service 120 sufficient information to identify potential content items for presentation on the client device. According to aspects of the disclosed subject matter, the extent and nature of the current context information 203 may be previously established between the client device and online service 120.

As part of the exemplary interaction 200, the online service 120, operating on a computer server 124, receives the request and current context information 203. In response to the request, at step 204, the online service identifies potential content items from the content item information data store 122, of which one may be presented as an external content item on the client device. Identifying the potential content items is made in accordance with the information and parameters of the current context information 203 received from the client device. For example, content items that are too large for presentation on the client device, as per the display size information, may be excluded as potential content items. Similarly, content items that would tax, above some predetermined threshold, the bandwidth capabilities of the communication channel between the client device and the online service may similarly be excluded from consideration. Content items relevant to the executing application and/or the execution context on the client device may be included among the potential content items. Other information in the current context information 203 could be applied, resulting in a set of potential content items for responding to the request.

As part of identifying the set of potential content items, at step 206, content item information 207 is generated. According to aspects of the disclosed subject matter, the content item information 207 may include, by way of illustration and not limitation, for each content item of the identified set of potential content items, a source and/or provider of the corresponding content item, descriptive information of the corresponding content item, a campaign for promoting the corresponding content item, and the like. Additionally, content item information 207 may also include a set of queries and/or conditional statements for the client device to complete with locally stored data that may include personal identifying information (PII). These queries and conditional statements may correspond in information regarding the application, information regarding other applications available on the client device, how often the user of the client device interacts with content items, the client device, and/or the user of the client device. Similarly, the queries may relate to the content items identified in the content item information 207, both generally and specific to individual content items.

By way of illustration and not limitation, the queries may correspond to how many times has any content item been presented on the client device during a prior time period or multiple prior time periods (e.g., the last 30 days, and/or the last 90 days), the number of times that any content item from the source or provider of a content item has been presented on the client device, whether and how many times has a specific content item (identified in the content item information 207) been presented on the client device, how many times has any content item related to a promotion campaign been presented on the client device, interaction information regarding any content item displayed on the client device, and the like.

In addition to queries, conditional statements may include items such as "if . . . then" statements, "if . . . then . . . else" statements, Boolean statements, as well as one or more combinations of the same. By way of illustration and not limitation, a condition corresponding to a first potential content item may correspond to a condition and query such as: if the executing application already includes module A, then reply with information corresponding to how long since module A has been installed in the executing application. Weighting information (or more simply, weights) may also be associated with content item with regard to the various queries and conditional statements. According to aspects of the disclosed subject matter, the content item information 207 may further include combinations of queries and conditional statements.

At step 208, the content item information 207, identifying a set of potential content items and further including a set of queries, conditional statements and/or weights, is transmitted to the client device 116, as shown in the exemplary interaction 200.

On the client device 116 and after receiving the content item information 207, at step 210, responses information corresponding to the queries and conditional statements of the content item information is generated according to user and device information, some or all of which may be viewed as PII, maintained on the client device. According to various embodiments and as indicated above, the user and device information is maintained in a local data store. Further and according to aspects of the disclosed subject matter, access to the user/client device information may be made through an application programming interface or API associated with the local data store, referred to as the Vision API. The responses to the queries and/or conditional statements of each potential content item, generated from information obtained from the Vision API are captured for each potential content item as a content item information record, and collectively returned as content item information records 213. At step 212, the content item information records 213 are returned to the online service 120.

At step 214 and based on the content item information records 213, the online service selects a content item from the set of potential content items as the external content item for presentation on the client device. According to aspects of the disclosed subject matter, in order to select a content item for presentation on the client device, responses to the queries for each content item, as included in the content item information records 213 are processed, resulting in a value score for each content item of the set of potential content items. The value score is indicative of a likelihood and measure of a user's interaction with the corresponding content item if presented as an external content item on the client device. In various embodiments, this scoring is carried out by a trained machine learning model, specifically trained to process the content item information records and generate the value score for each potential content item. Information maintained by the online service regarding promotion criteria and promotion requirements of the potential content items may also be included in the processing to determine a balanced value score, reflecting both the likelihood and measure of user interaction with the content item if presented on the client device, as well as the value to the online service of the presentation and likely user interaction on the client device. In view of and based on the values scores for each of the potential content items, a highest scoring content item is selected as the external content item for presentation on the client device.

At step 216, selected content item information 217 is transmitted to the client device. In various embodiments, the selected content item information 217 includes information corresponding to the selected content item. In addition to identifying the selected content item, the selected content item information may also identify a source (e.g., a network location) from which the selected content item (or its constituent elements or parts) may be obtained over the computer network 118. Alternatively, the selected content item information 217 may further include the selected content item for display/presentation on the client device. The selected content item information 217 may further include, by way of illustration and not limitation, parameters for displaying the selected content item, a time frame for continued presentation of the content item, a content item identifier for tracking user interaction with the selected content item, a source identifier of the provider/source of the selected content item, a campaign identifier of the selected content item, and the like.

At step 218, the client device 116 retrieves the selected content item from the identified source according to the selected content item information 217. Of course, this retrieval is carried out on the condition that the selected content item is not included in the selected content item information. In various embodiments, the constituent elements of the selected content item may be located at multiple locations on the computer network 118. In contrast, where the content item is included in the selected content item information, no retrieval is necessary. According to aspects of the disclosed subject matter, all or some of the constituent elements of the selected content item may be locally available in a cache. As such, part of retrieving the selected content item from the source may include retrieving at least some elements of the selected content item from a local cache. At step 220, the selected content item is presented as an external content item on the client device in the execution context of the application.

An additional, optional step 222 includes capturing user interaction data with respect to the now-presented external content item and, at optional step 224, the user interaction data is stored on the client device 116 as part of the locally maintained user and device information. Of course, information regarding the presentation of the external content item may also be recorded, typically via calls to the Vision API. In addition to local storage and at optional step 226, the user interaction information 227 may also be submitted to the online service for its tracking and reporting purposes. For its part, the online service, at step 228, may remove any and all PII from the user interaction information, and record PII-free user interaction information 227 in its own data store.

Additionally, as shown in the exemplary interaction 200, at some point after interacting with the client device, as part of the exemplary interaction 200 and as indicated by step 230, any and all PII of the user and/or the client device provided to the online service is discarded.

Figure 3A:
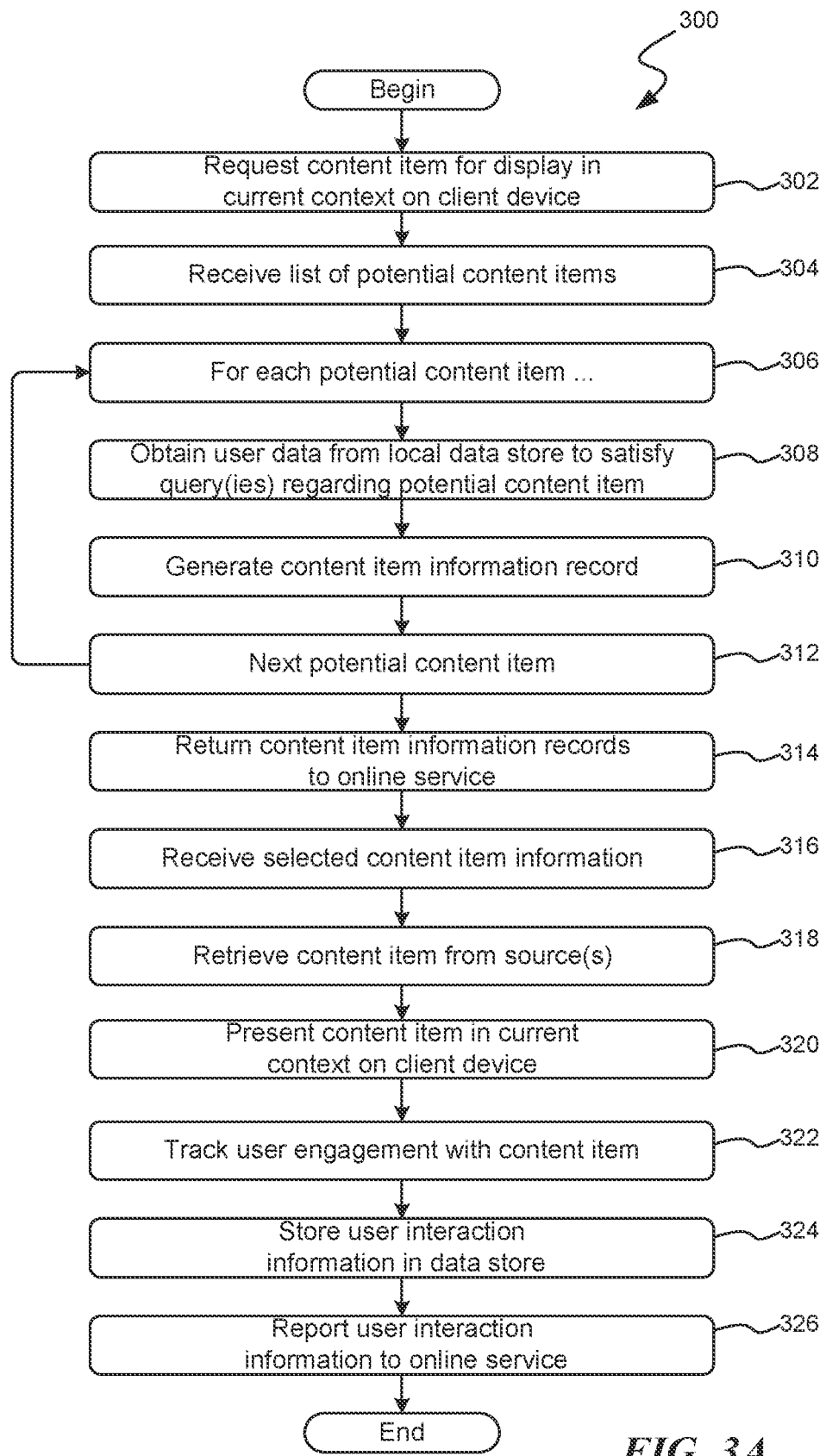
FIG. 3A is a flow diagram illustrating an exemplary routine, as implemented by a client device, regarding the interaction illustrated in FIG. 2, in obtaining an external content item for presentation within the context of an executing application on the client device, in accordance with aspects of the disclosed subject matter.

Turning now to FIG. 3A, FIG. 3A is a flow diagram illustrating an exemplary routine 300, as implemented by a processor on a client device, regarding aspects of the exemplary interaction 200 illustrated in FIG. 2. More particularly, this figure illustrates an exemplary routine 300 for obtaining an external content item from an online service 120 for presentation within the context of an executing application on the client device, all in accordance with aspects of the disclosed subject matter.

Beginning at block 302, a request for an external content item, for presentation on the client device in the context of the executing application, is sent to an online service 120 over the computer network 118. As indicated above, the request may include current context information 203. Current context information may include, by way of illustration and not limitation, identifying information regarding the application and the execution context of the application on the client device, an IP (internet protocol) address of the client device from which information such as geolocation and time zone may be determined, operating system information, communication information regarding the capabilities and/or available bandwidth of the network connection of the client device, display information such as display size, resolution, display features, etc., of the client device, and the like.

At block 304 and as part of the response to the request for an external content item, the client device receives content item information 207 that identifies a set of potential content items that could be displayed as an external content item on the client device. According to aspects of the disclosed subject matter, and as indicated above, the content item information 207 may include, by way of illustration and not limitation, for each potential content item represented in the data, a source/provider of a content item, information identifying a content item, a campaign for promoting a content, and the like. Additionally, the information of the content item information 207 may include queries, conditional statements, and/or weights. As discussed above, the queries and conditional statements may include how many times has any content item from a source been presented on the client device, whether and how many times has a specific content item been presented on the client device, how many times has a content item related to a particular campaign been presented on the client device, and the like. These queries may correspond to individual content items identified in the content item information, to information regarding the user, the client device, the application, the application context, and the like. These queries may further correspond to one or more prior time periods specified in the content item information and constrain any response to occurrences that happened during a given prior time period.

At block 306, an iteration is begun that iterates through the potential content items identified in the content item information 207, with the purpose of providing response information for each. Thus, at block 308 and as part of the iteration, responsive information for queries regarding a currently-iterated potential content item is generated according to user and device information maintained in a user data store on the client device, or otherwise available on the client device. As indicated above, this responsive information is also generated according to any conditional statements and/or weights that may be included in the content item information 207. As suggested above, access to the locally-available information may be gained through an application programming interface, such as Vision API. At block 310, a content item information record corresponding to the currently-iterated potential content item is generated. This record includes the responsive information for the current currently-iterated potential content item, generated from information obtained from the Vision API.

At block 312, if there are additional potential content items in the content item information 207 to process, the routine 300 returns to block 306 where a next potential content item is selected for processing. Alternatively, once all potential content items of the content item information have been processed, the routine 300 proceeds to block 314.

At block 314, the content item information records 213 are returned to the online service 120. At block 316, selected content item information 217 is received from the online service, the selected content item information identifying an external content item for display on the client device in the execution context of the executing application. According to aspects of the disclosed subject matter, the selected external content item is selected from the potential content items of the content item information 207 according to, at least, the content item information records 213. In various embodiments of the disclosed subject matter and as suggested above, the selected content item information 217 identifies a source from which the selected external content item (or the various constituent items of the selected, external content item) may be obtained over the computer network 118. Alternatively, the selected content item information 217 may include the selected external content item for display/presentation on the client device. The selected content item information 217 may further include, by way of illustration and not limitation, information such as parameters for displaying the selected external content item, a time frame for continued presentation of the external content item, a content item identifier for tracking user interaction with the external content item, a source identifier of the external content item, a campaign identifier of the external content item, and the like.

At block 318, in the event that the selected external content item is not included in the selected content item information 217, the selected, external content item (or constituent items) is retrieved from the identified source over the computer network 118. At block 320, the selected external content item is presented on the client device in the execution context of the executing application.

Optionally, at block 322, the presentation of the external content item and user engagement with the displayed external content item is tracked and, at block 324, the tracked user interaction data is recorded in the locally maintained user data store, typically via calls to the Vision API. In addition to local storage, at block 326, the user interaction information 227 is transmitted to the online service. In various embodiments, the user interaction data transmitted to the online service is a version of the data free of any PII regarding both the user and/or the client device. Thereafter, the routine 300 terminates.

Figure 3B:
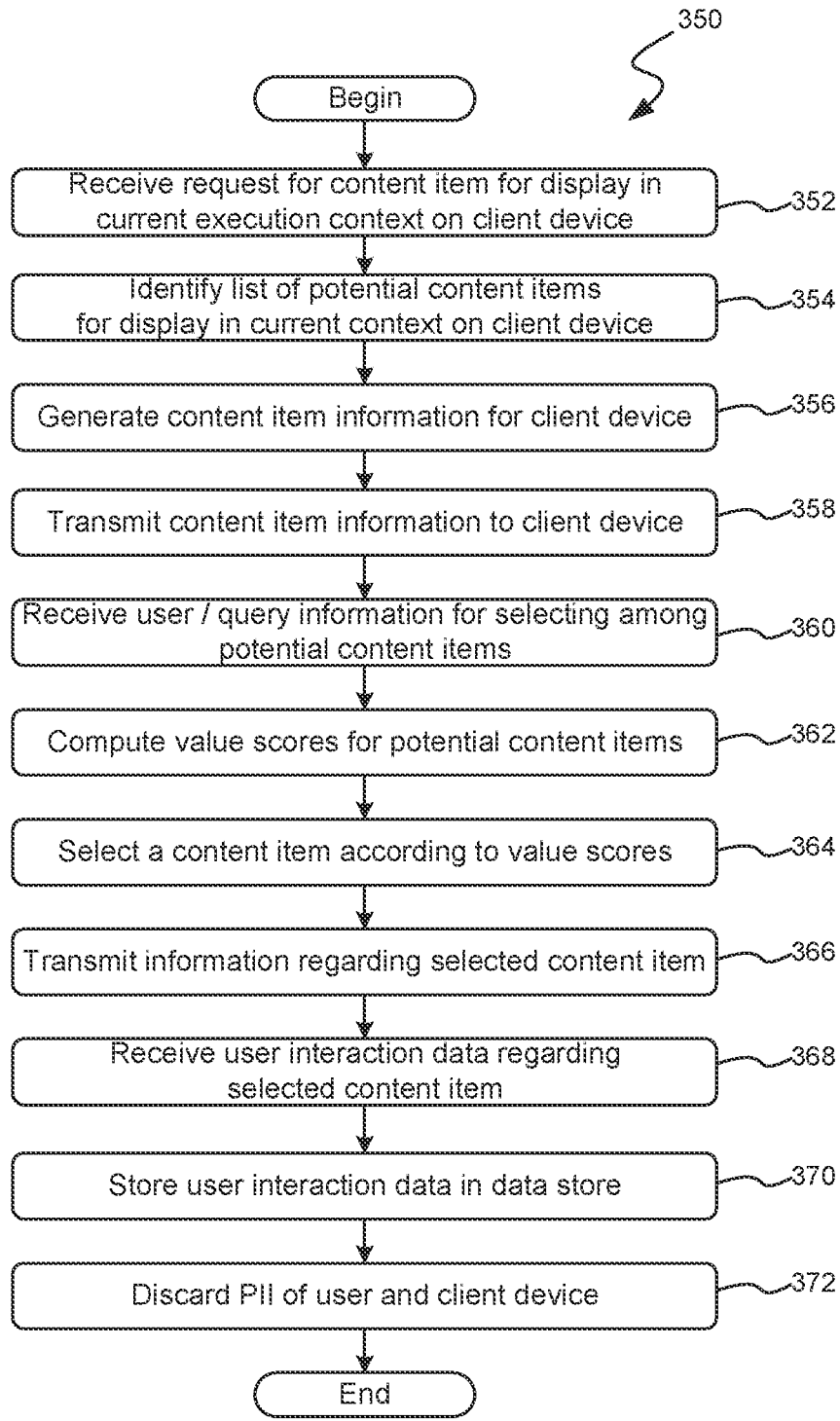
FIG. 3B is a flow diagram illustrating an exemplary routine, as implemented by an online service, regarding the interaction illustrated in FIG. 2, in providing an external content item for presentation within the context of an executing application on a client device, in accordance with aspects of the disclosed subject matter.

Turning to FIG. 3B, FIG. 3B is a flow diagram illustrating an exemplary routine 350, as implemented by an online service 120, regarding the interaction 200 illustrated in FIG. 2, in identifying a content item for presentation within the context of an executing application on a client device, in accordance with aspects of the disclosed subject matter. Beginning at block 352, the online service receives a request from a client device, such as client device 116, for an external content item to be displayed in an execution context of an executing application. According to various embodiments, the request includes, or is accompanied by, current context information 203, which, as discussed above, may include, by way of illustration and not limitation, identifying information regarding the application and the execution context of the application on the client device, communication information regarding the capabilities and/or available bandwidth of the network connection of the client device, display information such as display size, resolution, display features, etc., of the client device, and the like.

At block 354, the online service identifies a set of potential content items from its content item information data store 122 regarding content items that may be presented on the client device in the execution context of the executing application. According to aspects of the disclosed subject matter, this identification of potential content items is based on the current context information 203 received from the client device, as well as information regarding the promotion of the content items which the online service may have. At block 356, the set of potential content items, identified in content item information 207, as well as queries, conditional statements, and/or weights applied to the queries and conditional statements is generated. At block 358, the content item information regarding the identified potential content items, is transmitted to the client device.

At block 360, the online service receives content item information records 213 from the client device. As mentioned above, the content item information records comprise information responsive to the various queries, conditional statements and weights presented in the content item information. At block 362 and based on the content item information records, as well as additional information regarding promotions, providers and the potential content items, overall value scores for each of the potential content items is generated. In various embodiments, the overall value scores for each of the potential content items are generated by a trained machine learning model.

At block 364, a highest scoring content item of the potential content items is selected as the external content item for presentation on the client device. At block 366, selected content item information 217 is generated according to the highest scoring content item and transmitted to the client device. As indicated above, the selected content item information 217 includes information identifying the selected content item.

At block 368, user interaction data is received from the client device. The user interaction data may include specific interaction information, including by way of illustration and not limitation, how long the user viewed the content item, whether the user made any specific interaction (other than viewing) with the content item, whether the user purchased something represented by the content item, when the presentation occurred, when the user purchased an item represented by the content item, etc. At block 370, PII-free user interaction information is stored in a data store of the online service. At block 372, and according to aspects of the disclosed subject matter, any and all PII corresponding to a user of the client device or the client device itself gained through the interaction with the client device in providing an external content item, is discarded such that it is not retained by the online service 120. Thereafter, routine 350 terminates.

Figure 4:
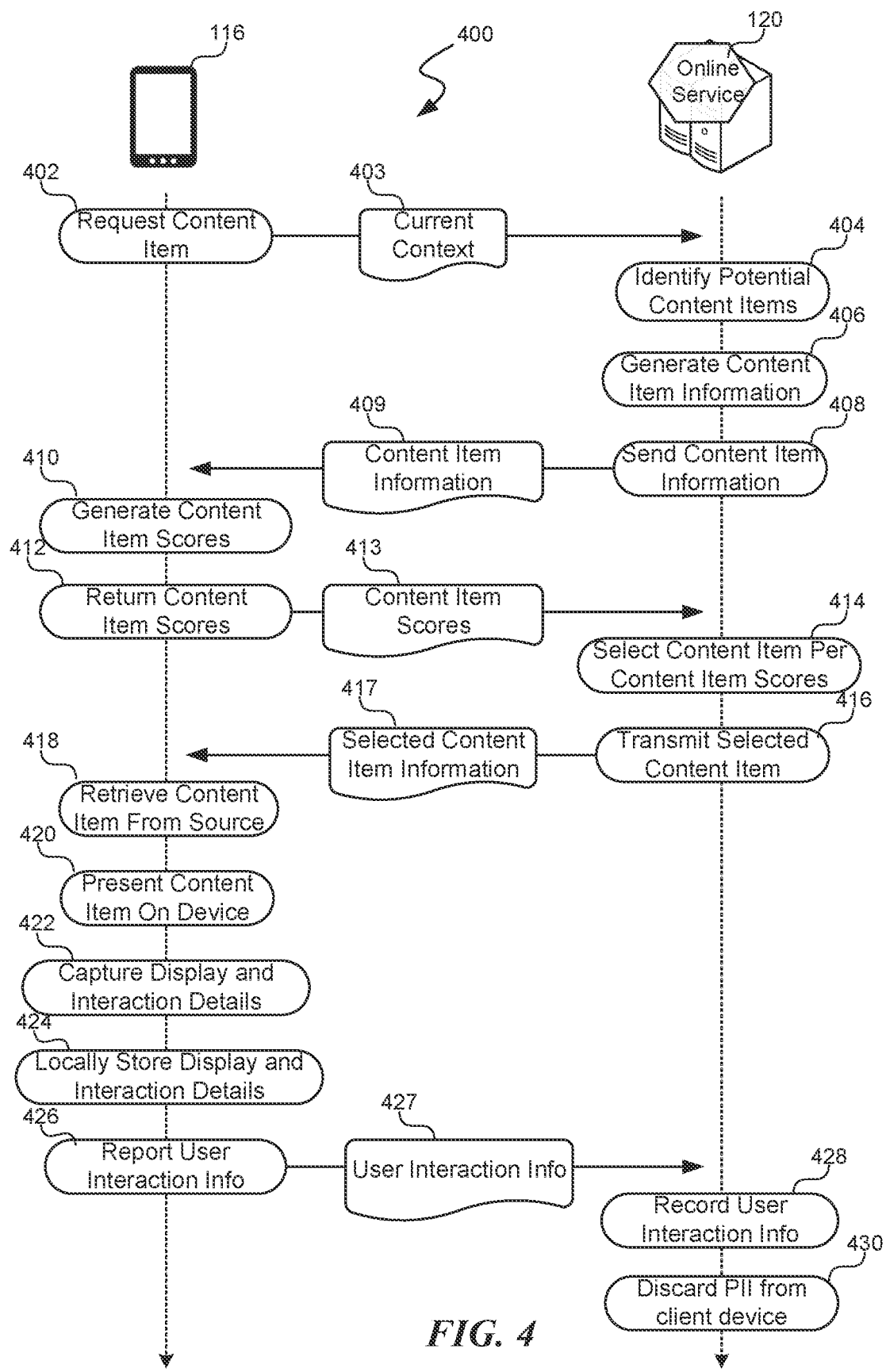
FIG. 4 is a block diagram illustrating an alternative, exemplary interaction between a client device and an online service to identify and provide an external content item for presentation within the context of an executing application, in accordance with aspects of the disclosed subject matter.

Turning now to FIG. 4, FIG. 4 is a block diagram illustrating an alternative, exemplary interaction 400 between a client device, such as client device 116, and an online service 120 to identify an external content item for presentation on the client device within the context of an executing application, in accordance with aspects of the disclosed subject matter. Regarding this interaction, and as with the exemplary interaction 200 of FIG. 2, the process starts with the client device detecting an execution condition for presenting an external content item in the execution context of an application.

At step 402, upon detecting the execution condition for presenting an external content item on the client device, the client device requests an external content item from the online service 120. In various embodiments, this request is accompanied by, or includes current context information 403. This current context information 403 is similar or, in some embodiments, the same to the current context information 203 described above in regard to interaction 200, including information related to the current execution context of the application on the client device, as well as display constraints of the device and application that would restrict out some content items from being included as potential content items.

At step 404, the online service identifies a set of potential content items for display on the client device from the content item information data store 122 that the online service maintains. As with step 204 of FIG. 2, this identification is based on the current context information 403 associated with, or included in, the request. At step 406, the online service generates content item information 409 regarding the set of potential content items and, at step 408, transmits the content item information 409 to the client device.

Regarding the content item information 409, and according to aspects of the disclosed subject matter, in addition to identifying the set of potential content items, additional information may be included. This additional information may comprise, by way of example and illustration and not limitation, a source for each of the potential content items indicating where the corresponding potential content item may be obtained over the computer network 118. Further, the content item information 409 may include, by way of illustration and not limitation, campaign information regarding each of the potential content items. The campaign information may comprise information regarding the promotion of a corresponding potential content item to the user. Still further, the content item information 409 may also include, by way of illustration and not limitation, one or more initial scores associated with each potential content item identified in the content item information 409. Indeed, according to aspects of the disclosed subject matter and in contrast to the content item information 207, the content item information 409 includes the initial scores which are to be processed by the client device and returned, as completed scores to the online service. Advantageously, a completed score for a content item does not include or correspond to any particular PII of a user or a client device. Thus, PII is not shared with the online service 120, and the online service has no obligation to discard information received in the interaction 400.

In addition to initial scores, the content item information 409 may also include weightings that may be applied to the initial scores by the client device, or to information local to the client device in generating completed scores for the items of content identified in the content item information 409. Further still, the content item information may identify the application of weighting based on one or more user preferences (of a user of the client device 116) for determining one or more completed scores for a given content item. By way of illustration and not limitation, these user preferences may include a weighting value that is applied upon a determination from locally maintained information that the user prefers content from a source of one or more content items identified in the content item information, or that a user prefers a particular type of content item for display. Negative user preferences may similarly be applied and/or utilized in the generation of a completed content item score for one or more of the content items identified in the content item information 409. Still further, the content item information 409 may also include conditional statements as well as weighting information that may be used in generating one or more initial scores into a completed score for a given, potential content item.

At step 410, the client device 116 (or, more specifically, a process executing on the client device) generates completed content item scores for each of the potential content items identified in the content item information 409. As already indicated, in various non-limiting embodiments these completed scores are generated from one or more initial scores for each of the content items identified in the content item information, as well as weighting information and conditional statements regarding processing information. According to aspects of the disclosed subject matter, as part of generating a completed content item score, at least one initial score for a given content item is mathematically combined with local information regarding the user and/or the client device in view of the weightings that may be included in the content item information 409. By way of example and for illustration purposes and not limitation, a set of initial scores for content item A corresponds to the set, {0.18, 0.38, 0.35}, where the first element corresponds to a multiplier to the number of times during a prior time period (as determined within the content item information 409) that a user of the client device 116 has viewed the identified content item, the second element corresponds to a multiplier to the number of times during the prior time period that the user of the client device has viewed any content item from the corresponding content item's source, and the third element corresponds to a multiplier to the number of times during the prior time period that the user of the client device has viewed a content item corresponding to the content item's promotion campaign.

In an alternative embodiment of the disclosed subject matter, the initial score or scores may be expressed as a function to be completed by the executing process on the client device, and/or a combination of initial scores and functions. By way of illustration and not limitation, an alternative set of initial scores for content item A corresponds to the set, {{2.0−X*0.25}, {3.0−Y*0.38}, 0.35}, where the first element corresponds to a multiplier function to the number of times (represented in the function as X) during a prior time period that the user of the client device 116 has viewed the identified content item, the second element corresponds to a multiplier function to the number of times (represented in the function as Y) during the prior time period that the user of the client device has viewed any content item from the corresponding content item's source, and the third element corresponds to a multiplier to the number of times during the prior time period that the user of the client device has viewed a content item corresponding to the content item's promotion campaign.

While any number of mathematical operations may be applied to the various initial scores, in one embodiment the completed score for a given content item is the sum of the various operations. With regard to the alternative example embodiment above, and with the value of X being 1 (one), the value of Y being 2, and the number of times that the user of the client device has viewed any content item corresponding to the content item's promotion campaign is 2, the completed score for content item A may be generated as follows:

completedScore$_A$={2.0−(1*0.25)}+{3.0−(2*0.38)}+(2*0.35), or 3.21 as a completed score for a potential content item.

After generating the completed score or scores for each content item identified in the content item information 409, at step 412 the client device returns the completed content item scores 413 to the online service 120. In alternative embodiments of the disclosed subject matter, rather than returning the completed scores for each of the potential content items, an indication of the highest scoring content item along with its completed score may be returned. In a further alternative embodiment, rather than returning any completed scores, an indication of the highest/best content item is returned to the online service 120.

At step 414, the online service 120 selects a content item from the set of potential content items identified in the content item information 409, according to the completed content item scores 413 for the content items. According to various embodiments of the disclosed subject matter, the selection may be based solely on the completed scores, with the content item having the "best" score (dependent on whether "best score" is a highest score or a lowest score) being selected as the external content item for presentation on the client device. In alternative embodiments, the selection may also include additional processing on the online service 120 based on the completed scores. This additional processing may result in a value score for each of the content items that leads to the selection of the external content item. In various embodiments, each value score is determined according to the completed scores and information regarding the value (to the online service) of having a particular content item presented on the client device. Indeed, in some embodiments, each value score is further determined by a trained machine learning model based on the completed scores, the value of presenting the content item on the client device to the online service, and a predicted likelihood of user engagement with the content item if displayed as the external content item on the client device.

After selecting a content item for presentation on the client device, at step 416, selected content item information 417 is transmitted to the client device. According to aspects of the disclosed subject matter, the selected content item information 417 includes information that identifies the selected content item to the client device, information regarding a source or provider of the selected content item, campaign information, and a source location from which the selected content item may be obtained. In some embodiments, the selected content item information 417 may, alternatively, include the selected content item, eliminating the need to retrieve it.

At step 418, the selected content item (and/or the content item's constituent elements) is retrieved from a source location if it is not included in the selected content item information 417. According to aspects of the disclosed subject matter, a smart cache may be employed such that a selected content item (or parts of a selected content item), if previously downloaded to the client device, may be retrieved from the smart cache. Indeed, in many instances, two different content items that are, as a whole, distinct may share one or more constituent elements, some of which may be cached in the smart cache, while others may need to be retrieved from a networked source location.

At step 420, the selected content item is presented as an external content item on the client device in the execution context of the executing application. At step 422, presentation and user interaction details regarding the external content item are captured. At step 424, these captured details are locally stored. At step 426, user interaction information 427, which may or may not contain information that may be viewed as PII, is transmitted to the online service 120. At step 428, PII-free user interaction information is recorded by the online service. As shown in the exemplary interaction 400, after transmitting the selected content item information 417 to the client device, and as indicated by step 430, any and all PII of the user and/or the client device provided in the current context information 403 and/or the user interaction information 427 is discarded and not stored by the online service 120.

Figure 5A:
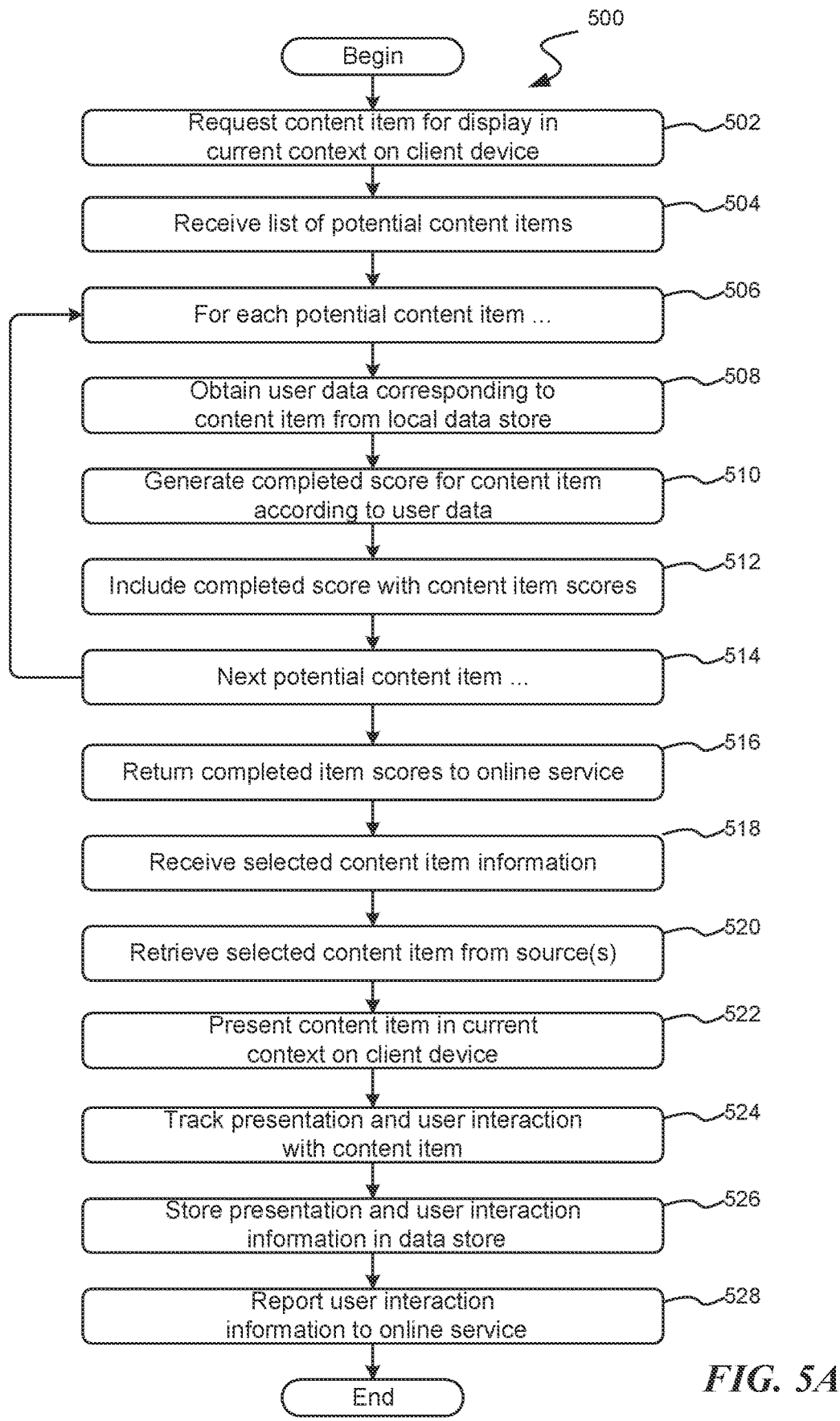
FIG. 5A is a flow diagram illustrating an exemplary routine, as implemented by a client device, regarding the interaction illustrated in FIG. 4, in obtaining an external content item for presentation within the context of an executing application on the client device, in accordance with aspects of the disclosed subject matter.

Turning now to FIG. 5A, FIG. 5A is a flow diagram illustrating an exemplary routine 500, as implemented by a client device, such as client device 116, regarding the interaction 400 illustrated in FIG. 4, in obtaining an external content item for presentation within an executing application on the client device, in accordance with aspects of the disclosed subject matter. As with routine 300 above, routine 500 is initiated upon the detection of an execution context to display an external content item on the client device. Beginning at block 502, a request for an external content item to be displayed in the current execution context of an application is sent to the online service 120 over the computer network 118. As indicated in FIG. 4, this request may be contained in or accompanied by current context information 403.

At block 504, content item information 409 that identifies a plurality of potential content items for display as an external content item in the current execution context of the executing application on the client device is obtained. As indicated above, the content item information 409 may include one or more initial scores for each potential content item identified in the content information, as well as other information to be utilized in determining completed scores for the set of potential content items.

At block 506, an iteration is begun to iterate through the potential content items identified in the content item information 409 in order to generate one or more completed scores for each of those content items. As part of the iteration, at block 508, user and/or client device data needed for generating one or more completed scores for a currently-iterated content item is obtained from the local data store. In various embodiments, this information is obtained through the Vision API discussed above.

At block 510, one or more completed scores for the currently-iterated content item are generated, as described above in regard to step 410 of interaction 400, with the completed score/scores generated according to information in the content item information 409 and according to the information obtained from the local data store. After generating the one or more completed scores for the currently-iterated content item, at block 512 the completed score or scores are included among the completed content item scores 413 that will be transmitted to the online service.

At block 514, if there are additional potential content items indicated in the content item information 409 to process, the routine 500 returns to block 506 to process another potential content item, i.e., generate one or more completed scores for that content item. Alternatively, if all potential content items identified in the content item information 409 have been processed, the routine 500 proceeds to block 516.

At block 516, the completed content item scores 413 are sent from the client device to the online service over the computer network 118. In response to sending the completed content item scores, at block 518, selected content item information 417 is received from the online service. The selected content item information identifies the selected external content item to be presented in the current context of the executing application. At block 520, in the event that the selected content item is not included in the selected content item information but, rather, that a source location for obtaining the selected content item is included, the selected external content item is retrieved. At block 522, the selected external content item is presented in the current context of the executing application.

At block 524, information regarding the presentation of and user interaction with the external content item is tracked/captured. At block 526, the presentation/user interaction information is stored in the local data store. In addition to local storage, at block 528, user interaction information 427 is provided to the online service 120. Thereafter, the routine 500 terminates.

Figure 5B:
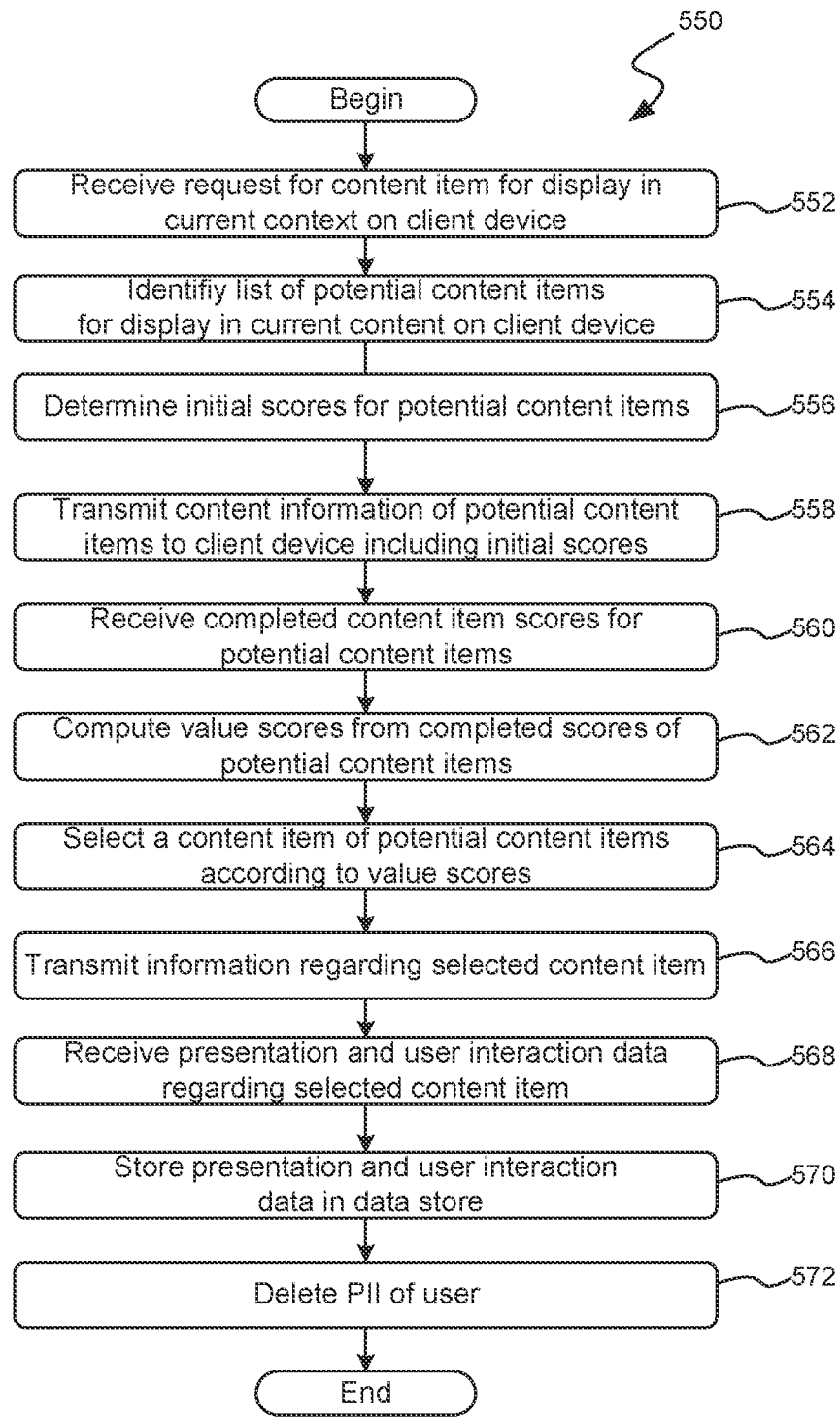
FIG. 5B is a flow diagram illustrating an exemplary routine, as implemented by an online service, regarding the interaction illustrated in FIG. 4, in identifying an external content item for presentation within the context of an executing application on a client device, in accordance with aspects of the disclosed subject matter.

Turning to the online service portion of the interaction 400 described above, reference is now made to FIG. 5B. FIG. 5B is a flow diagram illustrating an exemplary routine 550, as implemented by an online service 120, regarding the interaction 400 illustrated in FIG. 4, in identifying an external content item for presentation within an executing application on a client device 116, in accordance with aspects of the disclosed subject matter.

At block 552, a request for an external content item to be displayed in the context of an executing application on the requesting client device is received. As described above, the request may include or be accompanied by current context information 403.

At block 554, a list of potential content items that can be presented on the requesting client device is identified. This list is made in view of the current context of the user and the client device provided in the current content information 403. At block 556, initial scores for each of the identified content items are determined. According to aspects of the disclosed subject matter, initial scores may be the same for all content items or may be determined as a function of campaign information, value to the online service, or the like. Other information, such as weightings and conditional statements, may be included for scoring the potential content items. The potential content items and initial scores are captured in content item information 409 and, at block 558, are transmitted to the client device as a partial response to the request.

At block 560, completed content item scores 413 are received from the client device, including one or more completed content item scores for each potential content item identified in the content item information 409. According to aspects of the disclosed subject matter, a completed content item score for a first content item is not the same as an initial score associated with the first content item. In alternative embodiments of the disclosed subject matter, rather than returning the completed scores for each of the potential content items, an indication of the highest scoring content item along with its completed score may be returned. In a further alternative embodiment, rather than returning any completed scores, an indication of the highest/best content item is returned to the online service 120.

At block 562, value scores are determined as a function of the completed scores, a determined value of presenting a content item on the client device to the online service, and a likelihood of user engagement with the content item. In various embodiments, this determination may be made according to a trained, machine learning model.

At block 564, a potential content item having the best (e.g., either highest or lowest, whichever is indicative of greatest value to the online service) value score is viewed as the selected content item for presentation on the client device. At block 566, selected content item information 417 is transmitted to the client device, the selected content information identifying the selected content item. At block 568, user interaction information is received from the client device indicating that the selected content item was (or was not) presented on the client device, and any user interaction with the selected content item if presented on the client device. At block 570, a PII-free version of the presentation and user interaction information is stored in a data store for maintaining such information. At block 572, any PII information regarding the user and/or the client device obtained in the course of the interaction 400 is discarded. Thereafter, routine 550 terminates.

Figure 6:
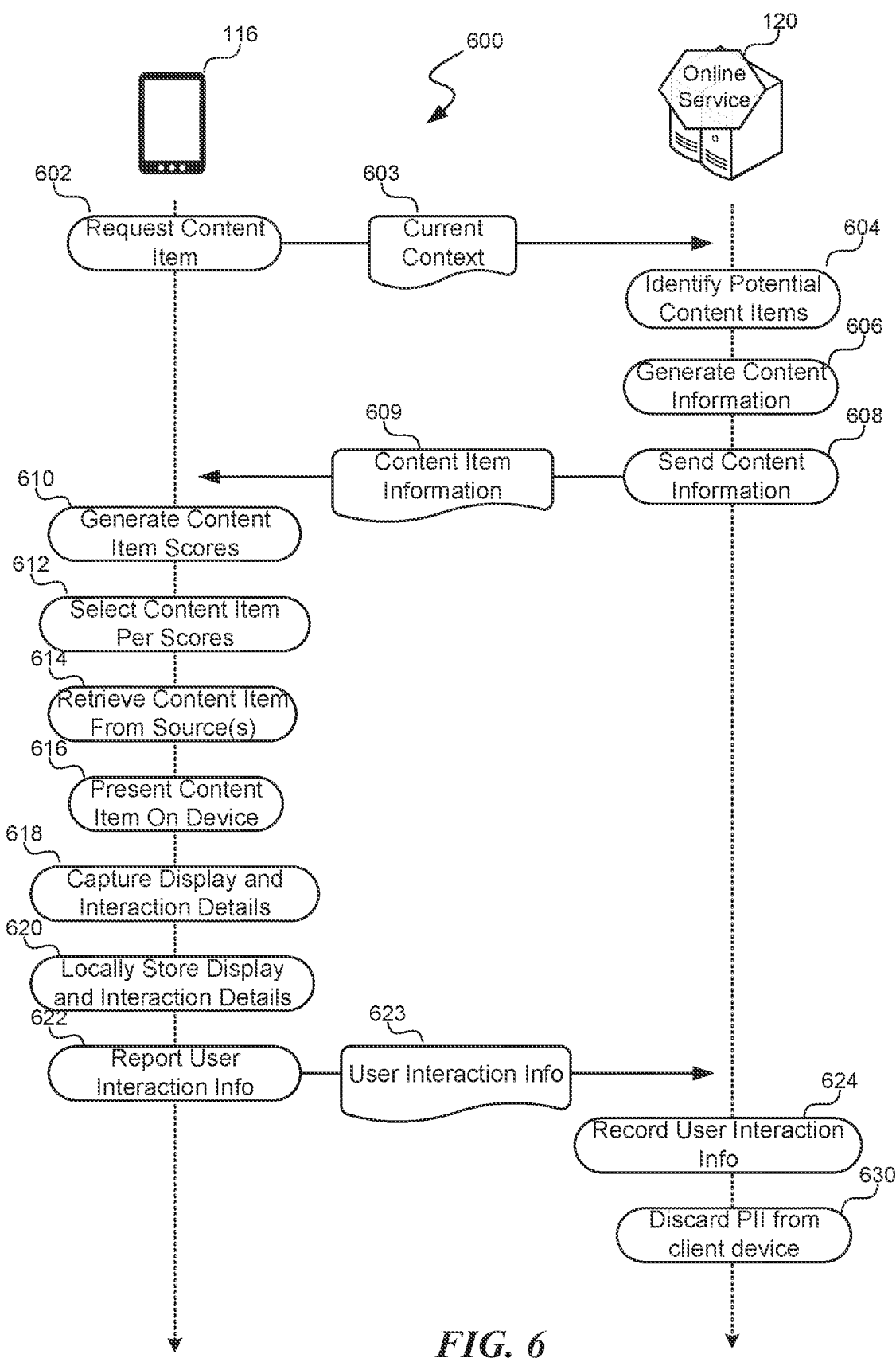
FIG. 6 is a block diagram illustrating another, alternative exemplary interaction between a client device and an online service to identify and provide an external item to the client device for presentation within the context of an executing application, in accordance with aspects of the disclosed subject matter.

In yet another embodiment of the disclosed subject matter, FIG. 6 is a block diagram illustrating an alternative exemplary interaction 600 between a client device 116 and an online service 120 to identify an external content item for presentation within an executing application on the client device, in accordance with aspects of the disclosed subject matter.

The interaction begins at step 602 with the client device (or, more particularly, a process or application executing on the client device) requesting an external content item to be presented in the current context of an executing application on the client device. As with the exemplary interactions above, this request includes or is accompanied by current context information 603, similar to or the same as that of current context information 403.

On the online service 120, and in response to receiving the request for an external content item from the client device 116, at step 604 the online service (or, more particular, a process or application of the online service) identifies potential content items that could be presented in the current context on the client device. According to aspects of the disclosed subject matter, these potential content items are selected from the content item information data store 122 that the online service 120 maintains.

At step 606, the online service generates content item information 609 regarding the potential content items and, at step 608, transmits the content item information to the client device. While the content item information 609 includes information that may typically be included in the content item information 409 described above, including one or more initial scores for corresponding potential content items, according to various aspects of the disclosed subject matter regarding this embodiment, the content item information 609 further includes information necessary to enable the client device to select a content item from the potential content items for presentation in the current context of the executing application. Indeed, according to aspects of the disclosed subject matter, this selection is made according to completed scores generated on the client device, and according to any information provided by the online service as contained in the content item information 609. The additional information may include final processing instructions, weightings and conditional statements, selection criteria, promotional value information, and the like for use in processing completed scores (as described above) into value scores.

On the client device and at step 610, completed content item scores are generated for each of the potential content items identified in the content item information 609. Completed content item scores are generated in a similar manner to that described above in regard to step 410 of interaction 400 of FIG. 4. Additionally, additional processing instructions to determine an overall value score for each of the content items may be identified by the content item information 609. These additional processing instructions may include a final weighting to be applied to each completed content item score, a set of processing instructions per content item, a set of mathematical operations to be carried out, and the like. The result of the additional processing instructions is a value score for each content item identified in the content item information 609.

At step 612, a selected content item is identified from the potential content items listed in the content item information 609 according to the corresponding generated value scores. At step 614 and based on information in the content item information, the selected content item is retrieved from its source (or from the content information from which it is included). According to aspects of the disclosed subject matter, the selected content item, or at least some constituent elements of the selected content item, may be retrieved from a local cache. As such, part of retrieving the selected content item from its source may also include retrieving the selected content item, or some constituent elements of the selected content item, from a local cache. At step 616, the selected content item, an external content item to the executing application, is presented in the context of the executing application on the client device.

At step 618, presentation and user interaction information regarding the presentation and subsequent user interaction with the external content item is tracked and captured. At step 620, the tracked and captured presentation and user interaction data is stored locally in a local data store on the client device. At step 622, a version of the user interaction data 623 is sent to the online service. In some embodiments, the user interaction information is processed on the client device to remove PII prior to sending it to the online service. Alternatively, the user interaction information is transmitted to the online service where, in step 624, PII-free data is stored/recorded by the online service in its own data store. At step 630, any PII information regarding the user and/or the client device that was captured in the course of the exemplary interaction 600 is discarded.

Figure 7A:
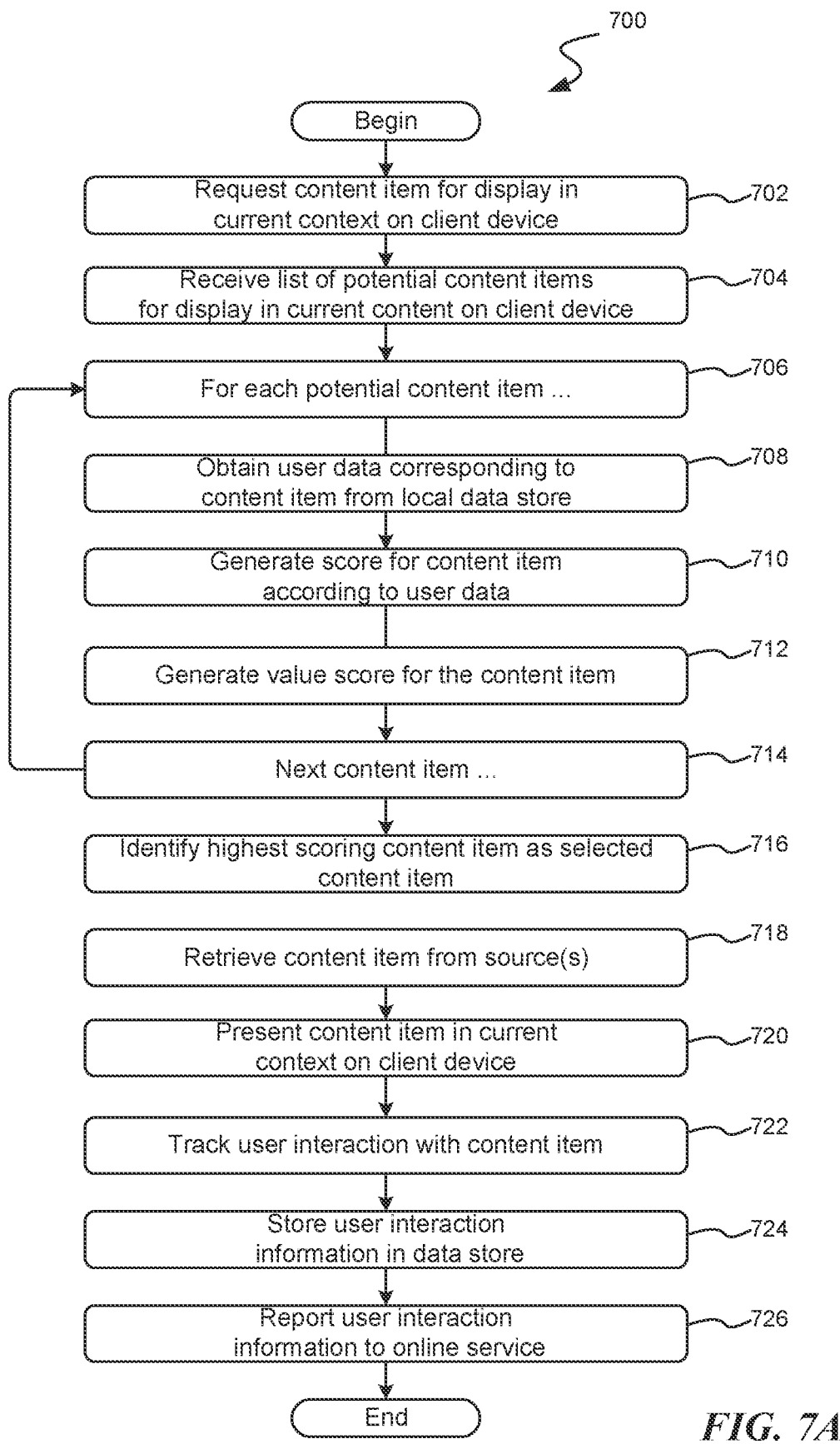
FIG. 7A is a flow diagram illustrating an exemplary routine, as implemented by a client device, regarding the interaction illustrated in FIG. 6, in obtaining an external content item for presentation within the context of an executing application on the client device, in accordance with aspects of the disclosed subject matter.

Turning to FIG. 7A, FIG. 7A is a flow diagram illustrating an exemplary routine 700, as implemented by a client device (or, more particularly, a process executing on the client device), regarding the interaction 600 illustrated in FIG. 6, in obtaining a content item for presentation within an executing application on the client device, in accordance with aspects of the disclosed subject matter.

Beginning at block 702, a request for an external content item, for presentation on the client device in the execution context of an application, is submitted to the online service 120. According to aspects of the disclosed subject matter, the request for an external content item may be accompanied by or include current context information 603. As in other embodiments of the disclosed subject matter, this current context information 603 may include, by way of illustration and not limitation, identifying information regarding the application and the execution context of the application on the client device, communication information regarding the capabilities and/or available bandwidth of the network connection of the client device, display information such as display size, resolution, display features, etc., of the client device, and the like.

At block 704, content item information 609 is received from the online service 120. This content item information identifies a set or list of potential content items from which one content item may be selected for presentation on the client device in the context of the executing application. Additionally, the content item information 609 may include one or more initial scores for the content items identified in the content item information. Still further, the content item information 609 may also include additional information necessary to generate completed scores for the identified potential content items, such as weighting and conditional statements, and further include final processing information leading to the selection of a content item as an external content item for presentation on the client device. Advantageously, this selection is made independent of further processing by the online service 120. The additional information may include final processing instructions, selection criteria, promotional value information, and the like for use in processing completed scores (as described above) into value scores, as described above.

At block 706, an iteration is begun to iterate through the potential content items identified in the content item information 609 to generate one or more completed scores for each of the potential content items. As part of the iteration, at block 708, user and/or client device data needed for generating a completed score for a currently-iterated potential content item is obtained from the local data store. In various embodiments, this information is obtained through the Vision API discussed above. At block 710, one or more completed scores for the currently-iterated potential content item is generated, as described above in regard to step 610 of interaction 600. As mentioned above, generating one or more completed scores is made according to information in the content item information 609 and according to the information obtained from the local data store. According to various embodiments of the disclosed subject matter, the completed scores may be made according to an average of various scores and values generated for a potential content item, or an aggregation of various scores for the content item. Scores may relate to distinct periods of times and time frames (e.g., weekdays, weekends, evenings, nights, holidays, etc.) Scores may be further generated according to a given location of the client device.

At block 712, one or more steps of valuation processing are carried out on the completed scores to determine an overall value score for each of the content items identified by the content item information 609. These additional processing instructions may include a final weighting to be applied to each completed content item score, a set of processing instructions per content item, and/or a set of mathematical operations to be carried out. As suggested, the result of the additional processing instructions is a value score for each content item of the content information.

At block 714, if there are additional potential content items in the content item information 609 to process, the routine 700 returns to block 706 to process another potential content item, i.e., generate one or more completed scores for that content item. Alternatively, if all potential content items identified in the content item information 609 have been processed, the routine 700 proceeds to block 716.

At block 716, a highest scoring potential content item is identified as the selected external content item according to the generated value scores. At block 718, the selected content item is retrieved, either from the content item information 609 or from an external source according to source information in the content information for the selected content item. At block 720, the selected content item is presented, as an external content item, on the client device in the context of the executing application.

At block 722, presentation and user engagement information with the now-presented content item is tracked. At block 724, presentation and user interaction information is stored locally on the client device. In various embodiments, this storage is carried out through an API, such as the Vision API described above. At block 726 and according to various embodiments, a reduced version of the presentation and user engagement information, that does not include any PII, is reported to the online service. The user interaction information 623 includes the identity of the selected content item. Of course, in alternative embodiments, the same user interaction information that is stored locally to the client device may be transmitted to the online service, which subsequently discards any PII. Thereafter, the routine 700 terminates.

Figure 7B:
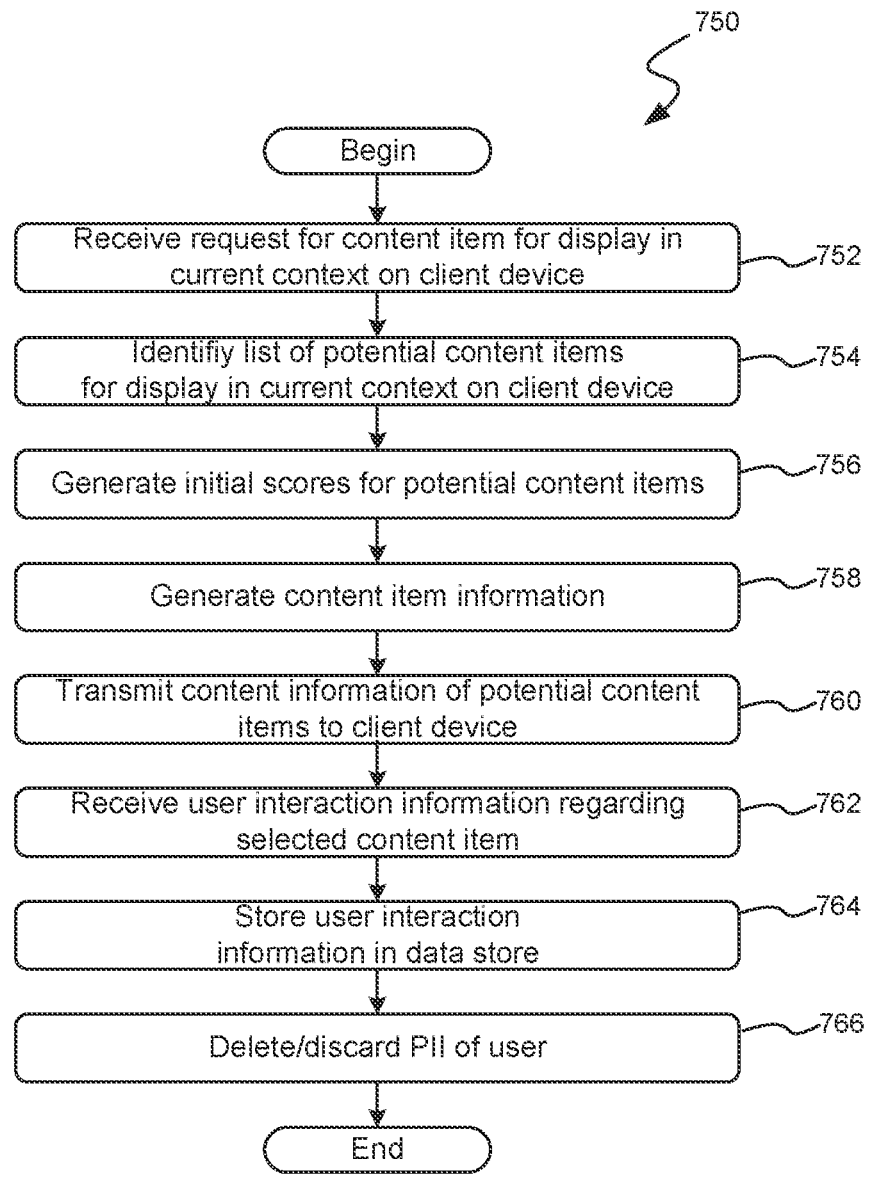
FIG. 7B is a flow diagram illustrating an exemplary routine, as implemented by an online service, regarding the interaction illustrated in FIG. 6, in identifying an external content item for presentation within the context of an executing application on a client device, in accordance with aspects of the disclosed subject matter.

Turning now to the online service side, FIG. 7B is a flow diagram illustrating an exemplary routine 750, as implemented by an online service 120, regarding the interaction 600 illustrated in FIG. 6, in identifying an external content item for presentation within an executing application on a client device 116, in accordance with aspects of the disclosed subject matter.

At block 752, a request for a content item to be displayed in the context of an executing application on the requesting client device is received. As described above, the request may include or be accompanied by current context information 603.

At block 754, the online service identifies a list of potential content items, each available for presentation on the client device in the execution context of the application. At block 756, initial scores for those items in the list of potential content items are generated. At block 758, content item information 609 is generated. As discussed above, the content item information 609 includes information identifying the list of potential content items and, for each content item identified, also may include a source of the content item, and a campaign of promoting the content item to users, and one or more initial scores. Still further, the content item information 609 may include information useful to enable the client device 116 to select a potential content item for presentation, as an external content item, in the current context of the executing application. Indeed, according to aspects of the disclosed subject matter, this selection will be made according to the to-be-generated completed scores or overall value scores, and according to any information provided by the online service as contained in the content item information 609, independent of the online service. The additional information may include final processing instructions, selection criteria, promotional value information, and the like for use in processing completed scores (as described above) into value scores.

At block 760, the content item information 609 is transmitted to the client device 116. At block 762, presentation and user interaction information 623 regarding the presentation of a selected content item on the client device and subsequent user interaction is received. In various embodiments, the received presentation and user interaction information 623 does not include any PII. In alternative embodiments, however, the online service filters the user interaction information prior to storing the filtered data. At block 764, the user interaction information 623 is stored. At block 766, PII information that has been received in the course of the exemplary interaction 600 is discarded. Thereafter, the routine 750 terminates.

Regarding interactions and routines 200, 300, 350, 400, 500, 550, 600, 700 and 750 described above, as well as other routines and/or processes described or suggested herein, while these routines/processes are expressed in regard to discrete steps, these steps should be viewed as being logical in nature and may or may not correspond to any specific, actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted.

Optimizations of routines may be carried out by those skilled in the art without modification of the logical process of these routines and processes. Those skilled in the art will recognize that the logical presentation of steps is sufficiently instructive to carry out aspects of the claimed subject matter irrespective of any specific development or coding language in which the logical instructions/steps are encoded. Additionally, while some of these routines and processes may be expressed in the context of recursive routines, those skilled in the art will appreciate that such recursive routines may be readily implemented as non-recursive calls without actual modification of the functionality or result of the logical processing. Accordingly, the particular use of programming and/or implementation techniques and tools to implement a specific functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices and/or computing systems, such as client device 116 illustrated in FIG. 9 and the online service implemented on a computer system 124 described in FIG. 10. Additionally, in various embodiments, all or some of the various routines may also be embodied in executable hardware modules including, but not limited to, systems on chips (SoC's), codecs, specially designed processors and/or logic circuits, and the like.

As suggested above, these routines and/or processes are typically embodied within executable code segments and/or modules comprising routines, functions, looping structures, selectors and switches such as if-then and if-then-else statements, assignments, arithmetic computations, and the like that, in execution, configure a computing device or computer system to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in executable instructions embodied within applications (also referred to as computer programs), apps (small, generally single or narrow purposed applications), and/or methods, these aspects may also be embodied as computer-executable instructions stored by computer-readable media, also referred to as computer-readable storage media, which (for purposes of this disclosure) are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines and/or processes.

Examples of computer-readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), solid-state drives (SSDs), memory cards, thumb drives, and the like; and cloud storage (i.e., an online storage service), and the like. While computer-readable media may reproduce and/or cause to deliver the computer-executable instructions and data to a computing device for execution by one or more processors via various transmission means and mediums, including carrier waves and/or propagated signals, for purposes of this disclosure and unless specifically stated otherwise, claims of computer-readable media expressly exclude carrier waves and/or propagated signals, i.e., transitory mediums.

Figure 8:
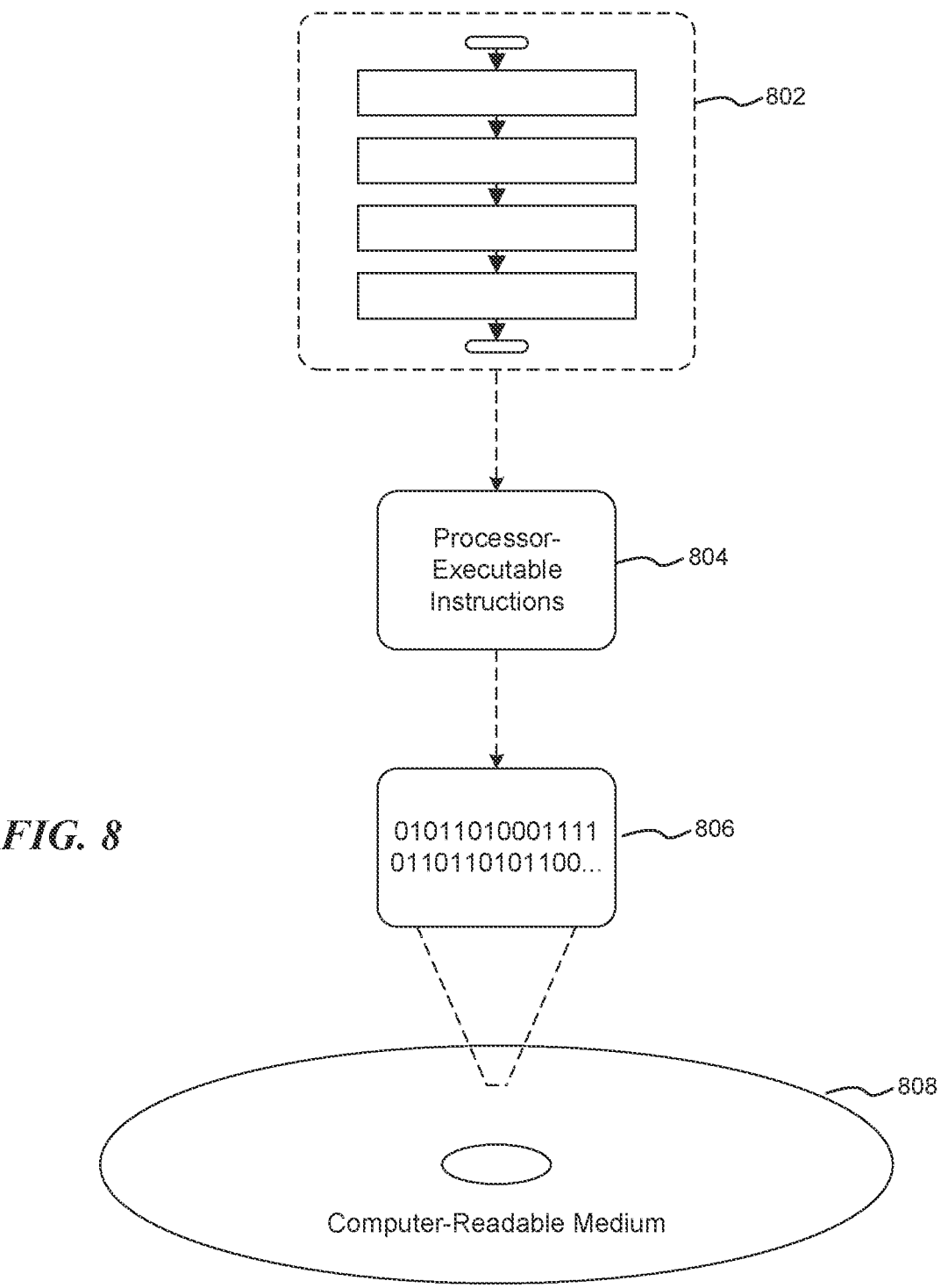
FIG. 8 is a block diagram illustrating an exemplary computer readable medium encoded with instructions for implementing aspects of the disclosed subject matter.

Regarding computer-readable media, FIG. 8 is a block diagram illustrating an exemplary computer-readable medium 808 encoded with instructions for conducting one or more elements of a promotion campaign and reporting corresponding conversion counts, formed in accordance with aspects of the disclosed subject matter. More particularly, the illustrated implementation comprises a computer-readable medium 808 (e.g., a CD-R, DVD-R or a platter of a hard disk drive), on which is encoded computer-readable data 806. This computer-readable data 806 in turn comprises a set of processor-executable instructions 804 configured to operate according to one or more of the principles set forth herein. In one such embodiment 802, the processor-executable instructions 804 may be configured to perform a method, such as at least some of various interactions and routines described above. In another such embodiment, the processor-executable instructions 804 may be configured to implement a system on a computing system or client device, such as at least some of the exemplary, executable components of computer system 124, as discussed in FIG. 10. Many such computer-readable media may be devised, by those of ordinary skill in the art, which are configured to operate in accordance with the techniques presented herein.

Figure 9:
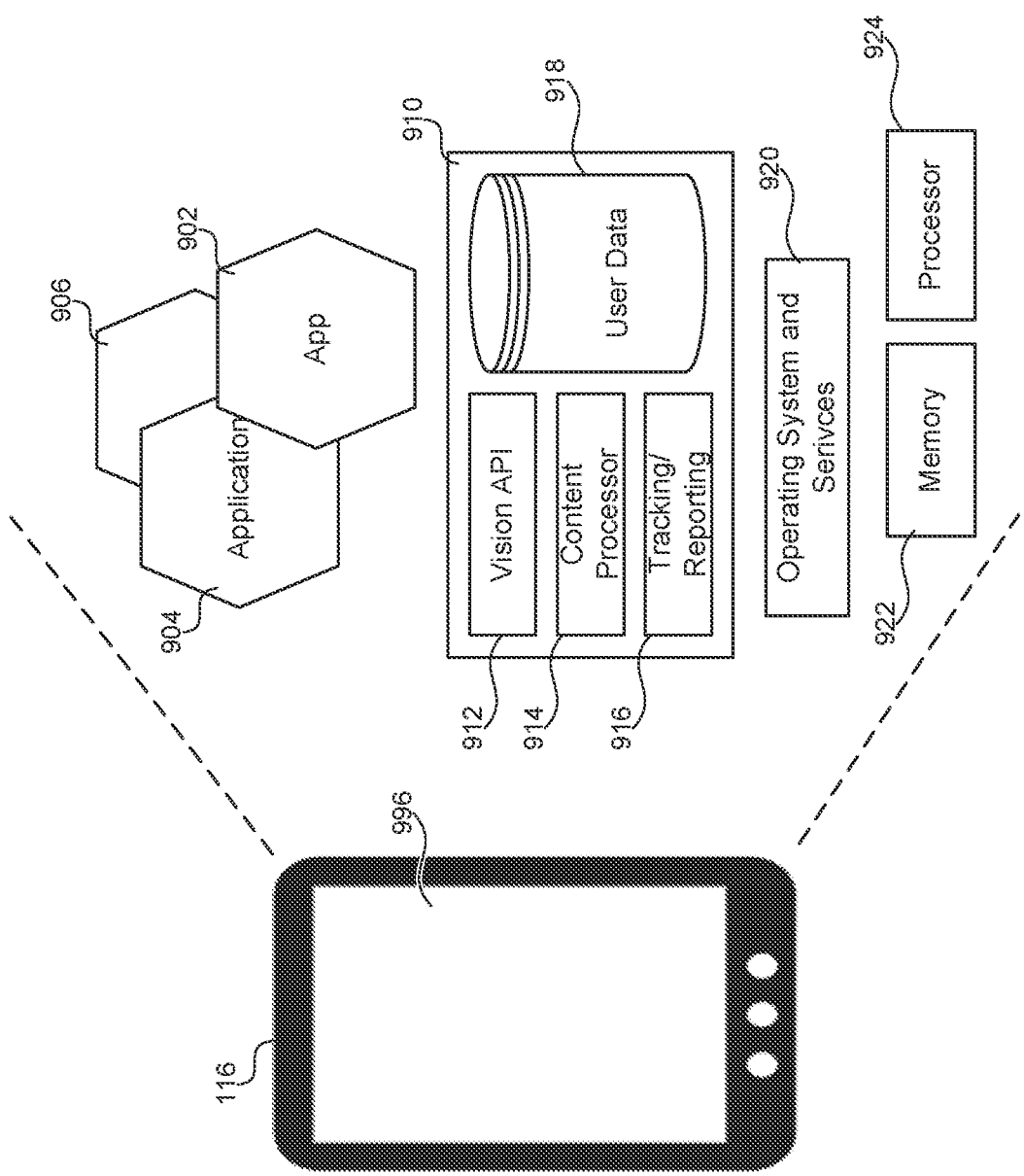
FIG. 9 is a block diagram illustrating components of a client device, suitably configured in accordance with aspects of the disclosed subject matter.

Turning to FIG. 9, FIG. 9 is a block diagram illustrating exemplary components of a suitably configured client device, in accordance with aspects of the disclosed subject matter. The client device includes at least a processor 924, and further includes at least one memory 922, from which executable instructions and data may be retrieved and executed by the processor. The processor 924 and memory 922, as well as other components of the computing system, are typically interconnected by way of a system bus.

As will be appreciated by those skilled in the art, the memory 922 typically (but not always) comprises both volatile memory and non-volatile memory. Volatile memory retains or stores information so long as the memory is supplied with power. In contrast, non-volatile memory can store (or persist) information even when a power supply is not available. In general, RAM and CPU cache memory are examples of volatile memory whereas ROM, solid-state memory devices, memory storage devices, and/or memory cards are examples of non-volatile memory.

As will be also appreciated by those skilled in the art, the processor 924 executes instructions retrieved from the memory 922, from computer-readable media, such as computer-readable medium 808 of FIG. 8, and/or other executable components, in carrying out the various functions of the disclosed subject matter. The processor 924 may be comprised of any of several available processors, such as single-processor, multi-processor, single-core units, and multi-core units, which are well known in the art.

Further still, the illustrated client device 116 typically also includes or operates on an operating system and services 920 which typically manages the launching and provides services to one or more apps, e.g., app 902, and applications, e.g., applications 904-906. As those skilled in the art will appreciate and by way of definition, an app is a computer-executable application in the sense that it is executed on a computing device and carries out one or more programmed functions/operations. However, in contrast to applications (e.g., applications 904, 906), an app typically though not exclusively, has a smaller set of operations and/or functionality than a typical application. Typically, though not exclusively, apps are designed to have a smaller storage requirement and operate on computing devices, such as mobile devices, having less processing bandwidth than a typical personal computer may have. For discussion purposes of the disclosed subject matter and unless a distinction between an app and an application is required, the term "application" should be viewed as referring to either an app or an application. With regard to the illustrated client device 116, one of these apps or applications, such as app 902, during the course of execution on the client device, may detect a condition for presenting an external content item on a display 996 in the execution context of the application.

The client device also includes an executable content requestor module 910. In execution the content requestor module interacts with an application, such as application 902, to carry out aspects of the disclosed subject matter, particularly in regard to obtaining an external content item for display on the client device. The content requestor module 910 includes a Vision API 912 that provides access to local data in a user data store 918 maintained on the client device. As discussed above, the local data may include PII data. The content requestor module 910 also includes content processor 914 that processes the potential content items in the course of determining a selected, external content item. A tracking and reporting module 916 tracks the presentation of an external content item in the context of an executing application, such as application 902, as well as user interaction with the content item. The tracking and reporting module 916 records this information in the local data store 918 via the Vision API 912. Additionally, the tracking and reporting module 916 may also provide PII-free tracking content to the online service 120 via the content processor 914.

Figure 10:
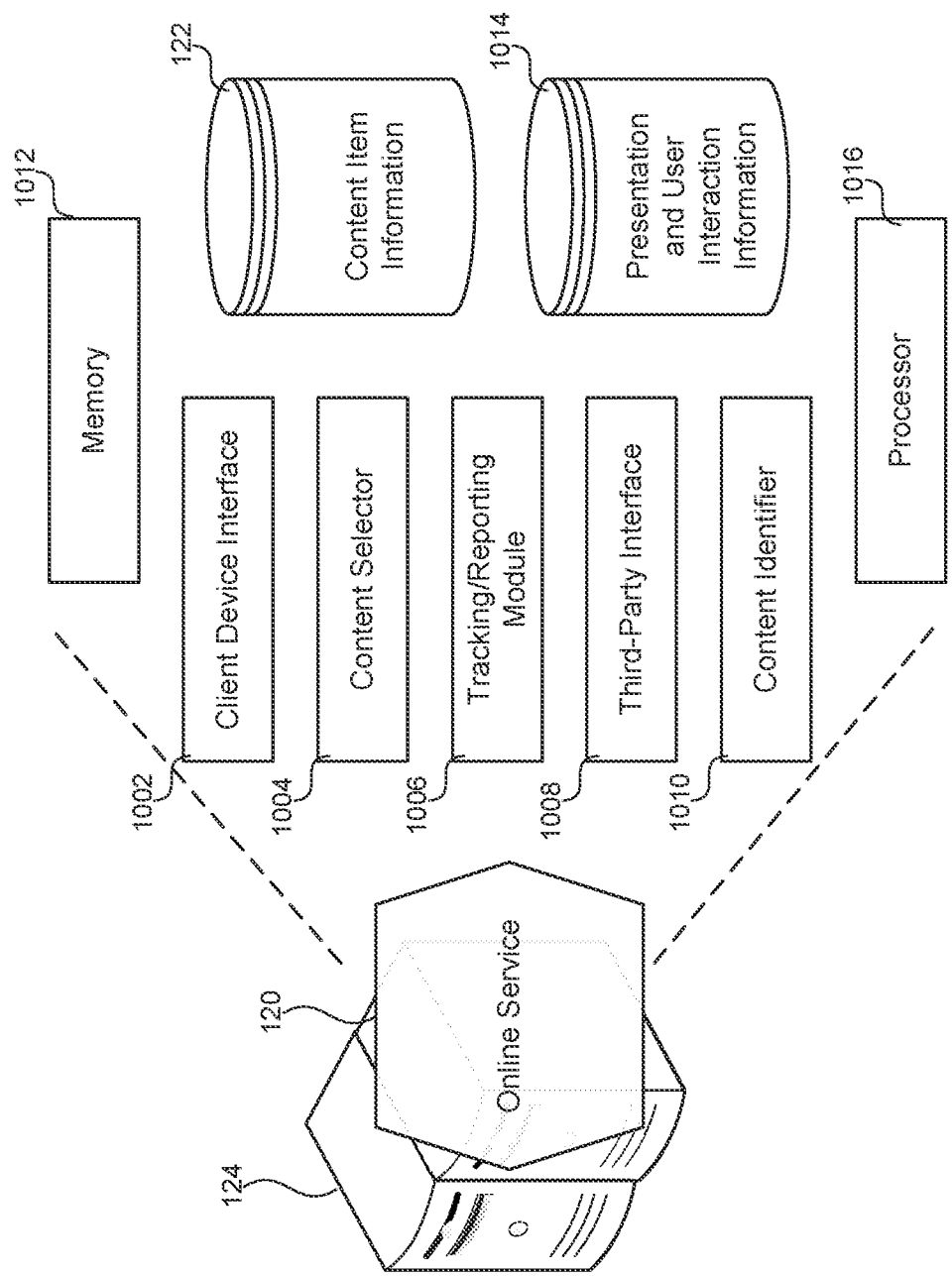
FIG. 10 is a block diagram illustrating components of an online service implemented on a computer system, suitably configured in accordance with aspects of the disclosed subject matter.

FIG. 10 is a block diagram illustrating components of an online service 120 implemented on a computer system 124, suitably configured in accordance with aspects of the disclosed subject matter. The computer system hosting the online service 120 includes a processor 1016 and a memory 1012.

An executable client device interface 1002 operates to manage interchanges with the client device in responding to a request for an external content item. An executable content identifier 1010 is configured to identify potential content items from a content item information data store 122 and return the potential content items as content information, via the client device interface 1002. An executable third-party interface 1008 interacts with third-parties, particularly in regard to obtaining information relating to content items that may be presented on client devices, and in determining promotion campaigns of various content items. An executable content selector 1004 is configured to generate value scores for content items based on completed content item scores, select a highest scoring content item as the external content item to be displayed on the client device, and provide the selected content item to the client device 116 by way of the client device interface 1002. A tracking/reporting component 1006 executes to track and/or record presentation information as well as user interaction data with a presented content item on a client device and store the information in a presentation and user interaction data store 1014. The tracking/reporting component 1006 further executes to report presentation of and user interaction with a content item to a third-party source of the content item.

Regarding the various components of the exemplary client device 116 and the computer system 124, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method as implemented on a client device, the method comprising:
   detecting a condition in an execution of an application on the client device to present an external content item on a display of the client device, wherein the external content item is not an element of the application;
   requesting the external content item from a remotely-located online service;
   in response to the request, receiving content item information corresponding to a plurality of content items from the remotely-located online service;
   processing the plurality of content items to determine a content item score for each of the plurality of content items, comprising, for each of the plurality of content items:
      accessing local information to the client device regarding the content item, wherein the local information is available from a data store maintained on the client device; and
      generating a completed content item score for the content item according to the local information and data regarding the content item in the content item information;
   submitting the completed content item scores for the plurality of content items to the remotely-located online service;
   in response to submitting the completed content item scores, receiving an indication from the remotely-located online service of a selected content item of the plurality of content items;
   retrieving the selected content item from an online source; and
   presenting the selected content item on the client device in the context of the execution of the application.

2. The computer-implemented method of claim 1, wherein generating a completed content item score for a content item according to local information and data regarding the content item in the content item information further comprises:
   accessing data of a plurality of aspects corresponding to a source of the content item from the local information; and
   generating the completed content item score as a function of the data of the plurality of aspects corresponding to the source of the content item.

3. The computer-implemented method of claim 2, wherein generating a completed content item score for a content item according to the local information and the content item information further comprises:
   determining user data of one or more of aspects corresponding to a user of the client device from the local information; and
   generating the completed content item score as a function of the data of the plurality of aspects corresponding to the source of the content item and the user data of the one or more aspects corresponding to the user.

4. The computer-implemented method of claim 3, wherein:
   the content item information includes an initial score for each of the plurality of content items; and
   generating the completed content item score further comprises generating the completed content item score as a function of the initial score for the content item, the data of the plurality of aspects corresponding to the source of the content item and the user data of the one or more aspects corresponding to the user.

5. The computer-implemented method of claim 4, wherein the user data includes a count of instances that any external content item originating from the source of the content item was presented to the user on the client device during a prior time period.

6. The computer-implemented method of claim 4, wherein the user data includes a count of instances that the content item was presented to the user on the client device during a prior time period.

7. The computer-implemented method of claim 4, wherein the user data includes a user-related preference as to a preferred source of content items for presentation on the client device.

8. The computer-implemented method of claim 4, wherein user data includes user interaction data with one or more content items from the source of the content item.

9. The computer-implemented method of claim 1, further comprising:
   generating a plurality of completed content item scores for each of the plurality of content items according to the local information and data regarding the content item in the content item information, wherein each completed content item score for a content item corresponds to one of a plurality of aspects of a source of the content item or an aspect corresponding to a user of the client device.

10. The computer-implemented method of claim 1, wherein the content item information includes, for each of the plurality of content items, online source information identifying an online source for retrieving the content item for presentation on the client device.

11. A computer-readable medium bearing computer-executable instructions which, when executed by an online service operating on a computing system comprising at least a processor executing the instructions, carries out a method comprising:
   receiving a request from a client device for a content item to be presented on the client device;
   identifying a plurality of content items for presentation on the client device;
   generating an initial score of each of the plurality of content items;
   generating content item information for the plurality of content items, the content item information identifying the initial scores associated with the plurality of content items;
   transmitting the content item information to the client device;
   receiving completed content item scores for each of the plurality of content items from the client device;
   generating a value score for each of the plurality of content items according to the completed content item scores and campaign information associated with the plurality of content items;
   selecting a first content item of the plurality of content items according to the generated value scores associated with the plurality of content items; and
   transmitting selection information identifying the selected first content item to the client device.

12. The computer-readable medium of claim 11, wherein:
   the request from the client device includes a current execution context of an application executing on the client device;

the identification of the plurality of content items for presentation on the client device is made according to the current execution context; and the current execution context does not include personal identifying information (PII) of a user or the client device.

13. The computer-readable medium of claim 12, wherein the current execution context includes information identifying the application from which the request was made, and further includes information identifying an execution aspect of the application from which the request was made.

14. The computer-readable medium of claim 12, wherein a current execution context includes display parameters of the client device by which an external content item is to be displayed, and communication parameters indicating a communication bandwidth of the client device.

15. The computer-readable medium of claim 11, wherein the selection information includes source location information for the client device to obtain the selected first content item.

16. The computer-readable medium of claim 15, wherein identifying the plurality of content items comprises identifying the plurality of content items according to campaign information of one or more third-party entities for presenting content items to users on client devices.

17. A computer system as implemented on a client device, the computer system comprising:
at least one memory; and
at least one processor executing instructions that carry out a method comprising the steps of:
detecting a condition in an execution of an application on the client device to present an external content item on a display of the client device, wherein the external content item is not an element of the application;
requesting potential content items over a network from a remotely-located online service;
in response to the request, receiving content item information identifying a plurality of content items;
processing the plurality of content items to determine a content item score for each of the plurality of content items, comprising:
accessing local information to the client device regarding the content item, wherein the local information is available from a local data store maintained on the client device; and
generating a content item score for the content item according to the local information and the content item information;
selecting a first content item from the plurality of content items according to completed scores of the plurality of content items;
retrieving the first content item from an online source; and
presenting the first content item on the client device in the context of the execution of the application.

18. The computer system of claim 17, wherein the instructions that, when executed by the at least one processor, further cause the at least one processor to carry out the method comprising the steps of:
obtaining user interaction information regarding user interaction by a user with the first content item presented on the client device; and
storing at least some of the user interaction information in the local data store.

19. The computer system of claim 18, wherein the instructions that, when executed by the at least one processor, further cause the at least one processor to carry out the method comprising the steps of:
removing personal identifying information (PII) from the user interaction information to create reduced user interaction information; and
transmitting the reduced user interaction information to the remotely-located online service regarding the presentation of and user interaction by the user with the first content item presented on the client device.

20. The computer system of claim 17:
wherein the content item information of the plurality of content items includes an initial score for each of the plurality of content items; and
wherein the instructions that, when executed by the at least one processor to cause the processor to perform the method step of generating the content item score for the content item according to the local information and the content item information further include instructions that cause the processor to perform the method steps of generating the content item scores according to the local information and the initial scores of the content items.

* * * * *